(12) United States Patent
Sherman et al.

(10) Patent No.: US 11,597,013 B2
(45) Date of Patent: Mar. 7, 2023

(54) LOW THERMAL STRESS ENGINEERED METAL STRUCTURES

(71) Applicant: Powdermet, Inc., Euclid, OH (US)

(72) Inventors: Andrew Sherman, Mentor, OH (US); Brian Werry, Euclid, OH (US)

(73) Assignee: POWDERMET, INC., Euclid, OH (US)

( * ) Notice: Subject to any disclaimer, the term of this patent is extended or adjusted under 35 U.S.C. 154(b) by 70 days.

(21) Appl. No.: 16/909,126

(22) Filed: Jun. 23, 2020

(65) Prior Publication Data

US 2020/0331064 A1    Oct. 22, 2020

Related U.S. Application Data

(60) Continuation-in-part of application No. 16/110,600, filed on Aug. 23, 2018, which is a
(Continued)

(51) Int. Cl.
    *C22C 29/14*    (2006.01)
    *B22F 3/11*     (2006.01)
    (Continued)

(52) U.S. Cl.
    CPC ............ *B22F 3/1112* (2013.01); *B21D 31/00* (2013.01); *B22F 3/16* (2013.01); *B32B 5/16* (2013.01); *B32B 5/18* (2013.01); *B32B 5/20* (2013.01); *C22C 1/1084* (2013.01); *C22C 29/14* (2013.01); *C22C 32/0031* (2013.01); *C22C 32/0036* (2013.01); *C22C 32/0078* (2013.01);
(Continued)

(58) Field of Classification Search
    None
    See application file for complete search history.

(56) References Cited

U.S. PATENT DOCUMENTS 3,781,170 A    12/1973  Nakao et al.
5,937,268 A *   8/1999  Ozaki ................... F16C 33/121
                                                    419/13
(Continued)

FOREIGN PATENT DOCUMENTS

GB      1379157       1/1975
WO    2011082102      7/2011

OTHER PUBLICATIONS

U.S. Search Authority, International Search Report and Written Opinion for related PCT/US2013/035602 (dated Jan. 21, 2014).
(Continued)

*Primary Examiner* — George Wyszomierski
(74) *Attorney, Agent, or Firm* — Ulmer & Berne LLP; Brian E. Turung

(57) ABSTRACT

A structured multi-phase composite which include a metal phase, and a low stiffness, high thermal conductivity phase or encapsulated phase change material, that are arranged to create a composite having high thermal conductivity, having reduced/controlled stiffness, and a low CTE to reduce thermal stresses in the composite when exposed to cyclic thermal loads. The structured multi-phase composite is useful for use in structures such as, but not limited to, high speed engine ducts, exhaust-impinged structures, heat exchangers, electrical boxes, heat sinks, and heat spreaders.

45 Claims, 11 Drawing Sheets

Related U.S. Application Data continuation-in-part of application No. 14/752,166, filed on Jun. 26, 2015, now Pat. No. 10,092,954, which is a division of application No. 13/445,810, filed on Apr. 12, 2012, now Pat. No. 9,096,034.

(60) Provisional application No. 62/866,297, filed on Jun. 25, 2019, provisional application No. 62/549,704, filed on Aug. 24, 2017, provisional application No. 61/474,712, filed on Apr. 12, 2011.

(51) Int. Cl.

| | | |
|---|---|---|
| *B21D 31/00* | (2006.01) | |
| *C22C 32/00* | (2006.01) | |
| *C22C 49/00* | (2006.01) | |
| *C22C 49/11* | (2006.01) | |
| *C22C 49/06* | (2006.01) | |
| *B32B 5/16* | (2006.01) | |
| *B32B 5/20* | (2006.01) | |
| *B22F 3/16* | (2006.01) | |
| *C22C 1/10* | (2023.01) | |
| *B32B 5/18* | (2006.01) | |

(52) U.S. Cl.
CPC .............. *C22C 49/00* (2013.01); *C22C 49/06* (2013.01); *C22C 49/11* (2013.01); *B22F 2003/1106* (2013.01); *B22F 2998/10* (2013.01)

(56) References Cited

U.S. PATENT DOCUMENTS

| | | |
|---|---|---|
| 7,037,865 B1 | 5/2006 | Kimberly |
| 7,041,250 B2 | 5/2006 | Sherman et al. |
| 8,110,143 B2 | 2/2012 | Rabiei |
| 8,535,604 B1 | 9/2013 | Baker et al. |
| 2003/0180171 A1 | 9/2003 | Artz et al. |
| 2004/0137259 A1 | 7/2004 | Pabla et al. |
| 2006/0065330 A1 | 3/2006 | Cooper et al. |
| 2007/0227299 A1* | 10/2007 | Marchiando ...... C04B 35/58071 75/244 |
| 2008/0223539 A1 | 9/2008 | Cooper et al. |
| 2010/0192808 A1 | 8/2010 | Datta et al. |
| 2010/0323213 A1* | 12/2010 | Aitchison ............... B32B 15/01 138/146 |
| 2011/0160104 A1 | 6/2011 | Wu et al. |

OTHER PUBLICATIONS

Bratt et al., "Mechanical Testing of Glass Hollow Microspheres", Material Science Research, vol. 15, pp. 441-447 (1983).

Schwartz, Harold, "Copper", ProKon Version 8.6, ShowMe Software (1997).

Mondal et al., "Cenosphere filled aluminum syntactic foam made through stir-casting technique", Composites: Part A 40; pp. 279-288 (2008).

Elert, Glen, "Density of Glass", Density of Glass—The Physics Handbook, N.p. 2004. Web. 31 (Jul. 2017).

Schwartz, Harold, "Properties of Copper and Nickel", ProKon Version 8.6, ShowMe Software (1997).

Balch et al., "Plasticity and damage in aluminum syntactic foams deformed under dynamic and quasi-static conditions", Materials Science and Engineering A. 391; pp. 408-417 (2005).

Kiser et al., "The mechanical response of ceramic microballoon reinforced aluminum matrix composites under compressive loading", Acta Metallurgica, vol. 47, No. 10, pp. 2685-2694 (1999).

Tao et al., "Compressive behavior of Al matrix syntactic foams toughened with Al particles", Scripta Materials, vol. 61, pp. 461-464 (2009).

Xu et al., "Ti Matrix Cyntactic Foam Fabricated by Powder Metallurgy: Particle Breakage and Elastic Modulus", Journal of Materials, vol. 63, No. 1, pp. 43-47 (2011).

* cited by examiner

LOW THERMAL STRESS ENGINEERED METAL STRUCTURES

The present disclosure claims priority on U.S. Provisional Patent Application Ser. No. 62/866,927 filed Jun. 25, 2020, which is incorporated herein by reference.

The present disclosure is a continuation-in-part of U.S. Ser. No. 16/110,600 filed Aug. 23, 2018, which in turn claims priority on U.S. Provisional Patent Application Ser. No. 62/549,704 filed Aug. 24, 2017, which is incorporated herein by reference.

This application is also a continuation-in-part of U.S. Ser. No. 16/110,600 filed Aug. 23, 2018, which in turn a continuation-in-part of U.S. Ser. No. 14/752,166 filed Jun. 26, 2015 now U.S. Pat. No. 10,092,954; issued Oct. 9, 2018), which in turn claims priority on U.S. Ser. No. 13/445,810 filed Apr. 12, 2012 (now U.S. Pat. No. 9,096,034; issued Aug. 4, 2015), which in turn claims the benefit of U.S. Provisional Application Ser. No. 61/474,712 filed Apr. 12, 2011.

REGARDING FEDERALLY SPONSORED RESEARCH OR DEVELOPMENT STATEMENT

Portions of this invention were developed and reduced to practice with the assistance of federal funds, under which the US government has certain government purpose rights. Federal assistance was received under NASA Contract NNX15CC63P, and DARPA contract W31P4Q18C0007.

TECHNICAL FIELD

The present disclosure pertains to the design and materials of construction of structures in which thermal or other strain-induced loads, such as constrained thermal growth and thermal gradient loads, contribute a large portion of the stresses, and which require controlled thermal properties to move and dissipate heat/temperature. In particular, the present disclosure pertains to a structured multi-phase composite which include a metal phase, a low modulus, high thermal conductivity ceramic phase (that optionally includes a heat transfer fluid such as a partially filled hollow balloon or shape) where the structure has reduced stiffness compared to the parent metal and a controlled coefficient of thermal expansion (CTE) to reduce thermal stresses in the structure when exposed to cyclic thermal loads. The structured multi-phase composite is useful for use in structures such as, but not limited to, heat shields, heat exchangers, high speed engine ducts, exhaust-impinged structures, and high speed and reentry aeroshells.

BACKGROUND

Numerous structures with technological importance are subjected to large temperature changes during use. Highly recognizable applications include thermal energy storage systems (such as molten salt storage), hypersonic vehicles, reentry vehicles, turbine and other high speed engine systems, combustion systems, and nuclear energy systems, among others. These large temperature swings or gradients in such applications which occur on start-up, operation, or use, impose severe design constraints in addition to environmental concerns such as corrosion or oxidation. In many cases, localized high heat fluxes create hot spots, and it is desired to move heat away from such hot spots so that the heat can be dissipated over a larger area. In other applications, high heat transfer is desired in the presence of large thermal gradients, such as heat exchangers and cooled structures (e.g., engine ducts, etc.).

Some design techniques for managing these conditions include:

Hypersonic leading edge—Structural loads that are exposed to high temperatures normally require exotic materials, which then must be integrated into a structure. It is desired to remove heat from this leading edge. A high thermal conductivity attachment, which places the leading edge in compression (e.g., has low CTE), is required to remove and spread or disperse heat, before being integrated into a vehicle structure. The resilient structure and high thermal conductivity offer high speed or extreme environment designers a tool for moving heat around and minimizing the use of ultrahigh temperature materials.

Heat exchangers—Heat exchangers that undergo non-continuous use experience severe thermal stresses. Such heat exchangers can have large temperature drops during the life of their use, which large temperature drops can cause thermal fatigue. Materials used to form these heat exchangers require high thermal conductivity, but also low CTE and low stiffness to minimize thermal stresses.

Cooled structures—In many high temperature uses, such as combined cycle or ramjet engines, thin metallic structures use cooling air or fuel cooling to remove heat. These structures need high thermal conductivity but suffer from high thermal gradients during transient and steady state use conditions.

Use of heat sinks or active thermal management—When the heat load is non-continuous or a when weight is not critical (such as in vehicles), a large thermal mass or thermal energy management system can be used. A thermal sink accumulates energy in a large heat capacity material, such as iron or phase change material. An active thermal system removes heat and transports it to a radiator or other heat rejection device. Active cooling is costly, normally requires bulky materials and, because it has many moving parts and fluids, is subject to reliability and maintenance issues.

In view of the problems of existing materials used in high thermal gradient environments, there is a need for an improved material having high thermal conductivity, low CTE, and low stiffness to minimize thermal stresses.

SUMMARY OF THE PRESENT DISCLOSURE

The present disclosure pertains to the design of, and materials of construction of, structures in which thermal or other strain-induced loads, such as constrained thermal growth and thermal gradient loads, contribute a large portion of the stresses to the structure. In particular, the present disclosure pertains to a structured multi-phase composite which includes a metal phase and a high thermal conductivity phase/component that are arranged to create high thermal conductivity, have controlled stiffness, and have a CTE to reduce thermal stresses in the structure when exposed to cyclic thermal loads. The structured multi-phase composite of the present disclosure is useful for use in structures such as, but not limited to, heat shields, cryotanks, high speed engine ducts, exhaust-impinged structures, and high speed and reentry aeroshells.

In accordance with one non-limiting aspect of the present disclosure, the high thermal conductivity phase of the structured multi-phase composite includes low stiffness, high thermal conductivity fillers. Such low stiffness, high thermal conductivity fillers include, but are not limited to, hexagonal boron nitride, cubic boron nitride, diamond, and/or graphite which have conductivities of 400-2,000 W/m-K (and all values and ranges therebetween), and/or MAX-phase materials with low stiffness and conductivities of 40-60 W/m-K (and all values and ranges therebetween). The MAX-phase materials are layered, hexagonal carbides and nitrides which have the general formula: $M_{n+1}AX_n$, (MAX) where n=1 to 4, and M is an early transition metal [e.g., Cr, hafnium, molybdenum, niobium, scandium, titanium, vanadium, zirconium], A is an A-group (mostly IIIA and IVA, or groups 13 and 14 [e.g., aluminum, arsenic, cadmium, copper, gallium, gadolinium, germanium, indium, lead, sulfur, silicon, tin, thallium, vanadium, zinc) element, and X is carbon and/or nitrogen. The layered structure consists of edge-sharing, distorted $XM_6$ octahedra interleaved by single planar layers of the A-group element). The MAX-phase material includes, but is not limited to, $V_2AlC$, $Ti_2AlC$, $Ti_3SiC_2$, $V_3AlC_2$, $Ti_3AlC_2$, $Ti_4SiC_3$, and $Ti_3(Si_{0.5}Ge_{0.5})C_2$.

In accordance with another non-limiting aspect of the present disclosure, the structured multi-phase composite can optionally include low stiffness fillers such as active phase change materials (e.g., carbon, ceramics (e.g., alumina ceramics, zirconia ceramics, boron oxide ceramics, silicon nitride ceramics, sialon, carbide ceramics (e.g., SSiC, LPS-SiC, RBSiC, NSiC, SiSiC, RSiC, SiC, TiC, ZrC, $B_4C$, $TiB_2C$), or other ceramic material)); ceramic-encapsulated materials (e.g., ceramic-coated copper, ceramic-coated zinc, ceramic-coated barium, ceramic-coated calcium, ceramic-coated cerium, ceramic-coated magnesium, ceramic-coated aluminum, ceramic-coated glasses, ceramic-coated metal salts (e.g., nitrates, chlorides, fluorides, bromides, etc.)); metal-encapsulated metals that included metals such as, but not limited to, copper, zinc, boron, barium, calcium, cerium, magnesium, nickel and/or aluminum; and/or metal coated materials (e.g., metal-coated glasses, metal-coated metal salts)). The active phase change materials (when used) may or may not have some initial porosity.

In accordance with another non-limiting aspect of the present disclosure, the structured multi-phase composite can optionally include low stiffness, high thermal conductivity fillers that can optionally be an easily vaporized material (e.g., sodium, potassium, magnesium, etc.). Such easily vaporized filler material can optionally be encapsulated into a microcapsule which can act as a miniature/micro heat pipe.

In accordance with another non-limiting aspect of the present disclosure, the temperature at which the high thermal conductivity phase changes occur can be selected or controlled by optionally using a particular filler or mixture of fillers in the structured multi-phase composite.

In accordance with another non-limiting aspect of the present disclosure, the structured multi-phase composite includes greater than 10 vol. % high thermal conductivity phase, and typically 25-65 vol. % high thermal conductivity phase (and all values and ranges therebetween).

In accordance with another non-limiting aspect of the present disclosure, the high thermal conductivity phase is generally dispersed in the metal phase or matrix to have contiguities of less than 0.1, and typically less than 0.05, and more typically less than 0.01.

In accordance with another non-limiting aspect of the present disclosure, the high thermal conductivity phase that is used in the structured multi-phase composite generally includes a ceramic material (e.g., alumina ceramics, zirconia ceramics, boron oxide ceramics, silicon nitride ceramics, sialon, carbide ceramics (e.g., SSiC, LPS-SiC, RBSiC, NSiC, SiSiC, RSiC, SiC, TiC, ZrC, $B_4C$, $TiB_2C$), or other ceramic material); however, the high thermal conductivity phase can also or alternatively include an intermetallic or metalloid. When the high thermal conductivity phase includes an intermetallic or metalloid, the intermetallic or metalloid filler generally has an average particle size of 10-500 microns in diameter (and all values and ranges therebetween), typically 30-300 microns in diameter, and more typically 50-200 microns in diameter. When the high thermal conductivity phase includes an intermetallic or metalloid, the intermetallic or metalloid filler generally has a melting point or softening point that is great than 1000° C., and typically greater than 1400° C.

In accordance with another non-limiting aspect of the present disclosure, the high thermal conductivity phase that is used in the structured multi-phase composite optionally includes a spheroidized/agglomerated high conductivity (intercalated or high purity) graphite and/or a hexagonal boron nitride.

In accordance with another non-limiting aspect of the present disclosure, the high thermal conductivity phase that is used in the structured multi-phase composite can optionally be coated with a material to reduce thermal contact resistance. Non-limiting coatings include tungsten, HfN, ZrN, and/or a wetting agent (e.g., copper, zinc, boron, barium, calcium, cerium, magnesium, nickel and/or aluminum, etc.) to create a high thermal conductivity interface and/or thermal protection.

In accordance with another non-limiting aspect of the present disclosure, the structured multi-phase composite can optionally include an additional high conductivity and/or low CTE ceramic phase. In one non-limiting embodiment, the additional high conductivity and/or low CTE ceramic phase can include chopped carbon fibers, SiC whiskers, BN flakes, boron nitrite and/or carbon nanotubes. In another non-limiting embodiment, the additional high conductivity and/or low CTE ceramic phase can constitute 1-10 vol. % (and all values and ranges therebetween) of the multi-phase composite (and all values and ranges therebetween). The additional high conductivity and/or low CTE ceramic phase to the multi-phase composite can be used to increase matrix thermal conductivity. The additional high conductivity and/or low CTE ceramic phase to the multi-phase composite can result in secondary phases being developed in the multi-phase composite by a) heat treatment, b) preferential segregation to the grain boundaries, and/or c) blended elemental additions being formed during the consolidation processing. The optional second phase additions to the metal phase or matrix can be used to refine the grain structure, increase the conductivity at interfaces (grain boundary), and/or increase the thermal conductivity of the multi-phase composite.

In accordance with another non-limiting aspect of the present disclosure, low contiguity (touching of ceramic phases) and/or high toughness and resilience of the multi-phase composite can be achieved when the high thermal conductivity phase content is greater than 20 vol. % by use of advanced processing techniques. These techniques include agglomeration, in which the one or more metals of the metal phase and high thermal conductivity phase are preblended. Such agglomeration methods include granulation, precompaction, powder coating, glatt or wurster bed coating, and/or liquid-solid blending. By adding some or all of the metal phase or matrix with the fluidized or suspended high thermal conductivity phase, the reduced levels of contiguity in the multi-phase composite can be achieved.

In accordance with another non-limiting aspect of the present disclosure, the well dispersed high thermal conductivity phase in the multi-phase composite can be optionally facilitated by the use of fine metal powders. Generally, the average particle size or diameter of the fine metal powders (when used) is generally less than 20% of the average particle size or diameter of the high thermal conductivity phase, and typically less than 10% of the average particle size or diameter of the high thermal conductivity phase.

In accordance with another non-limiting aspect of the present disclosure, the high thermal conductivity phase includes metals powders and microballoons. The average particle size or diameter of the metal powders can optionally be larger than the average particle size or diameter of the microballoons. The high thermal conductivity phase size distribution can be used to cause at least a portion of the fine metal powders to fill voids in the multi-phase composite. In one non-limiting embodiment, at least a portion of the metal powder has an average particle size or diameter of 1-20 microns (and all values and ranges therebetween); however, a portion of the metal powder can have an average particle size or diameter of up to 100-200 microns. In one non-limiting arrangement, when two or more different particle sizes of metal are included in the high thermal conductivity phase, the metal particles are added such that at least 20 vol. % of the metal materials have a particle size or diameter that is less than $1/10^{th}$ or $1/20^{th}$ the average high thermal conductivity phase particle size or diameter (and all values and ranges therebetween), and optionally 15-20 vol. % of the metal materials have a particle size or diameter that is about $1/5^{th}$ to $1/7^{th}$ the average high thermal conductivity phase particle size or diameter.

In accordance with another non-limiting aspect of the present disclosure, using shear during processing can optionally be used to facilitate in improved dispersions in the multi-phase composite. Shearing processes such as, but no limited to, extrusion and roll compaction along with the use of binders and lubricants, can be used to create low contiguity multi-phase composites.

In accordance with another non-limiting aspect of the present disclosure, a metal or active coating on the high thermal conductivity phase can optionally be used to prepare high strength, low contiguity multi-phase composites. The coatings can be applied by electroplating, electroless plating, chemical or physical vapor deposition, or other coating techniques. In one non-limiting embodiment, coatings of low melting braze or self-fluxing alloys (e.g., Ni-P, Ni-B, etc.), or low melting metals or eutectic metals (e.g., aluminum, magnesium, zinc, copper, silicon, etc.) can be used. Generally, the added metal is a desired alloying element and/or is highly soluble in the selected metal phase or matrix alloy system. The use of coatings on the high thermal conductivity phase has the advantage of strengthening the porous (e.g., hollow microballoons), and/or solid fillers (e.g., solid beads, fibers, etc.) and/or ensuring the fillers are gas-tight and/or low/zero contiguity while enhancing the sintering and/or consolidation cycle time of the multi-phase composites. The coating thickness on filler particles and/or microballoon fillers is generally about 0.5-5 microns (and all values and ranges therebetween), and/or the coating constitutes about 2-20 wt. % (and all values and ranges therebetween) of the total coated particle or coated microballoon. In one non-limiting embodiment, a eutectic or low melting content of 3-15 vol. % of metal coating is used, and typically 4-8 vol. % of metal coating is used on the particle and/or microballoon filler.

In accordance with another non-limiting aspect of the present disclosure, the structured multi-phase composite has a thermal conductivity that is least 80% of the thermal conductivity of the metal phase. In one non-limiting embodiment, the structured multi-phase composite has a thermal conductivity that is at least 20% greater than the thermal conductivity of the metal phase.

In another non-limiting embodiment, the structured multi-phase composite has a thermal conductivity that is at least 50% greater than the thermal conductivity of the metal of the metal phase. In another non-limiting embodiment, the structured multi-phase composite has a thermal conductivity that is about 80-100% greater than the thermal conductivity of the metal of the metal phase by the addition of use of a filler (e.g., such as carbon nanotube or graphene) and/or a secondary ceramic in the structured multi-phase composite.

In accordance with another non-limiting aspect of the present disclosure, the structured multi-phase composite has a flexural or compressive modulus reduction of at least 40% as compared to the metal of the metal phase to minimize thermal distortion and enhance thermomechanical performance. In one non-limiting embodiment, the structured multi-phase composite has a flexural or compressive modulus reduction of about 60-90% as compared to the metal of the metal phase. Modulus reductions of 60-80% can be obtained using various amounts of high thermal conductivity phase content, and lesser reductions of about 30-50% can be achieved using metal and/or salt-filled microbeads.

In accordance with another non-limiting aspect of the present disclosure, the structured multi-phase composite has a reduction in compressive strength that is less than the reduction in modulus/stiffness. For syntactic composites (bead-filled metals), strength decreases linearly or proportionate to the 3/2 power of high thermal conductivity phase content, while stiffness is reduced proportionate to the square of the high thermal conductivity phase content.

In accordance with another non-limiting aspect of the present disclosure, the overall density of the structured multi-phase composite can be controlled to be as low as possible while providing the desired mechanical properties of the structured multi-phase composite. In one non-limiting embodiment, the structured multi-phase composite has a 20-50% reduction in density (and all values and ranges therebetween) as compared to the metal phase, and typically the structured multi-phase composite has a 25-40% reduction in density as compared to the metal phase. In another non-limiting embodiment, the addition of lower density high thermal conductivity phase (e.g., BN, graphite, etc.) can be used to enhance density reduction of the structured multi-phase composite. In one non-limiting specific example, a filler, microbead, and/or microballoon content of 30-50 vol. % in the structured multi-phase composite can result in a density reduction of 25-45% in the structured multi-phase composite while retaining the high compressive strength of the structured multi-phase composite. In one non-limiting specific example, 1) when a multimodal size of high thermal conductivity phase (e.g., adding additional fillers 6-10× smaller or larger than the main microballoon filler) is used in the structured multi-phase composite, and/or 2) lightweight microfilters, fugitive additions, etc., are added to the structured multi-phase composite can result in the density of the structured multi-phase composite being reduced by 60-65% of the metal phase.

In accordance with another non-limiting aspect of the present disclosure, the structured multi-phase composite can have reduced stiffness, increased thermal conductivity and/or a CTE engineered for use in thermally-loaded structures. The structured multi-phase composite configuration can be designed to enable thermal engineering of thermally-loaded structures, while reducing thermal stresses by up to 90% (e.g., 40-80%) as compared to the one or more metals of the metal phase when absent the thermally-engineered high thermal conductivity phase.

In accordance with another non-limiting aspect of the present disclosure, the structured multi-phase composite is useful in cooled engine duct and component structures, heat exchanger tubes and plates, and thermal spreaders and heat sinks used to manage thermal loads that can manage thermal stresses, while reducing parasitic integration and attachment requirements.

In accordance with another non-limiting aspect of the present disclosure, the structured multi-phase composite can include a high thermal conductivity phase (which can optionally have a uniform shape and size) metal composite with thermal and mechanical properties that are tailorable by design.

In accordance with another non-limiting aspect of the present disclosure, the structured multi-phase composite can exhibit a dramatic reduction in modulus and increased thermal conductivity and a modest reduction in thermal expansion, while retaining good strength, toughness, and ductility of the engineering metals. The reduction in modulus, combined with controlled CTE and high/higher thermal conductivity, allows stress states to be controlled and minimized at attachment/dissimilar materials integration points, while providing highly efficient heat transfer or thermal load management to the structural properties required for heat exchanger or engine construction. Non-limiting properties of the structured multi-phase composite include:
  The structured multi-phase composite exhibits (as compared to conventional metals):
    increased thermal conductivity,
    reduced modulus,
    reduced density, and
    improved damage tolerance and impact resistance, metallic system;
  In hot structure (load-bearing) applications, these properties of the structure lead to:
    reduced mean free (average) structure temperature (via heat spreading or absorption),
    improved specific stiffness and buckling strength,
    reduced thermal stresses,
    >50% reduction in thermomechanical stresses,
    reduced system density/mass,
    ability to produce tubes and complex passages (e.g., plate heat exchangers, etc.)
    ease of integration (integrating sharp, UHT ceramic leading edges, etc.), and
    ease of assembly and fabrication (formable, threadable, braze/weldable, etc.).

In accordance with another non-limiting aspect of the present disclosure, the structured multi-phase composite can be used to enable the design of an integrated, structurally-efficient package that minimizes the need for parasitic thermal management and improves reliability and performance of thermally-loaded structures such as heat exchangers and high speed vehicle structures.

In accordance with another non-limiting aspect of the present disclosure, the structured multi-phase composite can be used to enable a low-cost, scalable design and the ability to manufacture computationally-engineered, multifunctional (syntactic composite) material isogrid/skin-stringer, and complex flow channel hot structure systems for thermal systems, heat exchangers, and cooled engine structures to dramatically reduce dry weight and cost of future hypersonic systems, molten salt and thermal energy storage systems, and engine components (e.g., shrouds, inlets, combustors, vanes, etc.), and other hot structures in which thermal stresses and heat transfer are a major design component.

In accordance with another non-limiting aspect of the present disclosure, the structured multi-phase composite can utilize a thermally-conducting metal matrix composite alloy having generally spherical, low stiffness inclusions/phases that are dispersed in a metal alloy or metal matrix composite.

In accordance with another non-limiting aspect of the present disclosure, the structured multi-phase composite can be formulated to resolve constrained thermal growth stresses, reduce parasitic mass, and resolve problems associated with hot structures that can carry large thermal gradients.

In accordance with another non-limiting aspect of the present disclosure, the structured multi-phase composite can be formulated to provide significant increase in thermal conductance or heat sink value (thermal diffusivity), but which is easily assembled, integrated, and attached to other structures.

In accordance with another non-limiting aspect of the present disclosure, the ordered arrangement of ceramic, potentially liquid/phase change phase, and metal in the structured multi-phase composite combines the thermal properties of graphite or ceramics (e.g., SiC, BN, etc.) with the mechanical properties and fabricability of metals, such as ductility and ease of attachment to other structures and materials. The structured multi-phase composite is weldable, brazeable, and boltable. Due to the unique composite structure of the structured multi-phase composite, the structured multi-phase composite has increased thermal conductivity or thermal diffusivity, reduced thermal expansion, reduced density, and reduced modulus or stiffness as compared to pure metals, thereby providing tremendous resistance to thermally-induced buckling and thermomechanical fatigue that can be encountered in high temperature, structurally-demanding environments.

In accordance with another non-limiting aspect of the present disclosure, the structured multi-phase composite can be used to negate or reduce the problems typically found with the creation of thermally-stressed structures such as hypersonic vehicles, engines, and thermal energy storage system components such as heat exchangers. Furthermore, the structured multi-phase composite can be fabricated from a range of metals including, but not limited to, titanium, iron, and/or nickel-based alloys for temperatures of 650-1100° C., and niobium, molybdenum, and other refractory metal alloys for temperatures of 1200-1700° C.+.

During the design and fabrication of high temperature structures, a designer has a choice between 1) cost prohibitive exotic material hot structures often using unreliable and costly ceramics or ceramic composites, and 2) complex cooled metallic structures operating with limited temperature or heat flux capabilities. By utilizing the engineered structured multi-phase composites of the present disclosure as a thermally-engineered structure, these past difficulties can be overcome, along with reducing the weight associated with traditional systems. In the case of molten salt thermal storage systems, the use of the engineered structured multi-phase composite of the present disclosure can reduce size, assembly, and sealing costs and extend the life of the heat exchanger, enabling operations in supercritical $CO_2$ or steam, and with high temperature salts or storage media such as mixed chlorides. The engineered structured multi-phase composite of the present disclosure also can be used to reduce thermal stresses and enable higher heat flux exposure to metallic structures or serve to integrate much reduced volume of exotic ceramics into a durable metallic structure.

In engine environments, the higher thermal transfer and reduced stresses increase combustor, inlet, and nozzle life and enable reduced weight and higher performance to be achieved.

In summary, the present disclosure relates to a structured multi-phase composite that can be subjected to cyclic thermal loads, and which structured multi-phase composite includes a multi-phase metal-ceramic-(optional) phase change material composite. The phase change material and ceramic phases of the structured multi-phase composite are typically discontinuous, and the metal phase is typically continuous. The structured multi-phase composite typically has at least a 25% lower modulus than the metal of the metal phase. The structured multi-phase composite typically has at least a 40% higher thermal conductivity than the metal of the metal phase. The structured multi-phase composite typically has a density at least 20% lower than the metal of the metal phase.

In accordance with another non-limiting aspect of the present disclosure, the metal phase of the structured multi-phase composite can include one or more high temperature metals, high temperature alloys, and high temperature composites (high temperature–melting point greater than 1000° C., typically greater than 1100° C., more typically greater than 1200° C., and even more typically at least 1250° C.) such as, but not limited to, titanium, niobium, nickel, iron, cobalt, molybdenum, tantalum, hafnium, zirconium, rhenium, or tungsten. Niobium alloys having a weight percent niobium of at least 50 wt. % can be used. Titanium alloys having a weight percent titanium of at least 50 wt. % can be used. Nickel alloys having a weight percent nickel of at least 40 wt. % can be used. Iron alloys having a weight percent iron of at least 35 wt. % can be used. Molybdenum alloys having a weight percent molybdenum of at least 50 wt. % can be used. Cobalt alloys having a weight percent cobalt of at least 30 wt. % can be used.

Non-limiting examples of the metal phase includes metal alloy system such as CB752 (e.g., 85-91 wt. % niobium, 1-5-3.5 wt. % zirconium, 8-12- wt. % tungsten, <0.2 wt. % carbon), C103 (e.g., 86-91 wt. % niobium, 8-12 wt. % hafnium, 0.5-2 wt. % titanium, 0-1.5 wt. % zirconium, 0-1 wt. % tungsten, 0-1 wt. % tantalum, <0.2 wt. % carbon), Nb-1Zr (e.g., 89-91 wt. % niobium, 0.5-1.5 wt. % zirconium, 0-0.4 wt. % hafnium, 0-0.2 wt. % titanium, 0-0.2 wt. % tungsten, 0-1 wt. % tantalum, <0.1 wt. % carbon), titanium-64 (e.g., 88-92 wt. % titanium, 3-5 wt. % vanadium, 5-7 wt. % aluminum, 0-0.6 wt. % iron, 0-0.2 wt. % carbon), tin 6242 (e.g., 84-89 wt. % titanium, 5-7 wt. % aluminum, 1.5-2.5 wt. % tin, 3-5 wt. % zirconium, 1.5-2.5 wt. % molybdenum, 0-0.5 wt. % silicon, 0-0.6 wt. % iron, 0-0.2 wt. % carbon), titanium β321S (e.g., 75-85 wt. % titanium, 12-18 wt. % molybdenum, 1.2-4 wt. % aluminum, 1.5-3 wt. % niobium, 0-0.5 wt. % tin), titanium aluminides (e.g., 50-80 wt. % titanium, 15-35 wt. % aluminum, 0-2.5 wt. % chromium, 0-2.5 wt. % niobium, 0-1 wt. % tantalum 0-1 wt. % boron), iron aluminides (e.g., 55-80 wt. % iron, 10-20 wt. % aluminum, 0-2.5 wt. % chromium, 0-2.5 wt. % niobium, 0-1 wt. % tantalum, 0-1 wt. % boron), nickel aluminides (e.g., 50-80 wt. % nickel, 15-35 wt. % aluminum, 0-4 wt. % chromium, 0-2.5 wt. % niobium, 0-1 wt. % tantalum, 0-1 wt. % boron, 0-9 wt. % cobalt), TZM (e.g., 95-99.5 wt. % molybdenum, 0.1-1 wt. % titanium, 0.01-0.5 wt. % zirconium, <0.1 wt. % carbon), IN909 (e.g., 37-57 wt. % iron, 30-45 wt. % nickel, 10-20 wt. % cobalt, 3-6 wt. % niobium, 0-2.5 wt. % titanium, 0-1 wt. % silicon, 0.5 wt. % aluminum, <0.2 wt. % carbon), IN718 (e.g., 45-60 wt. % nickel, 14-30 wt. % iron, 15-23 wt. % chromium, 3-6 wt. % niobium+tantalum, 0-5 wt. % molybdenum, 0-2 wt. % titanium, 0-1.5 wt. % aluminum, <2 wt. % cobalt, 0-1 wt. % silicon, <1 wt. % manganese, <1 wt. % copper, <0.2 wt. % carbon), IN625 (e.g., 55-65 wt. % nickel, 18-25 wt. % chromium, 6-12 wt. % molybdenum, 2-6 wt. % niobium, 0-6 wt. % iron, 0-1 wt. % titanium, 0-1 wt. % aluminum, 0-2 wt. % 0-1 wt. % tin, 0-1 wt. % manganese, cobalt, <0.2 wt. % carbon), IN753, MA956 (e.g., 37-57 wt. % iron, 16-23 wt. % chromium, 2-7 wt. % aluminum, 0-1 wt. % titanium, 0-1 wt. % copper, 0-1 wt. % manganese, 0-1 wt. % cobalt, 0-1 wt. % nickel, 0-1 wt. % Y2O3, <0.2 wt. % carbon), Ni200 (e.g., 98-99.9 wt. % niobium, 0-1 wt. % iron, 0-1 wt. % manganese, 0-0.5 wt. % copper, 0-1 wt. % silicon, <0.3 wt. % carbon), 1N800 (35-60 wt. % iron, 25-40 wt. % niobium, 15-28 wt. % chromium, 0-1 wt. % aluminum, 0-1 wt. % titanium, <0.2 wt. % carbon), IN783 alloy (e.g., 33-42 wt. % cobalt, 24-32 wt. % nickel, 22-30 wt. % iron, 2-5 wt. % chromium, 2-5 wt. % niobium, 4-7 wt. % aluminum, 0-1 wt. % manganese, 0-1 wt. % silicon, 0-1 wt. % copper, 0-0.8 wt. % titanium, 0-0.2 wt. % boron, <0.1 wt. % carbon), Waspaloy™ (e.g., 51-64 wt. % niobium, 15-24 wt. % chromium, 2-6 wt. % molybdenum, 10-18 wt. % cobalt, 0.5-2.5 wt. % aluminum, 1-4 wt. % titanium, 0-3 wt. % iron, 0-0.5 wt. % copper, <0.2 wt. % carbon), Haynes alloys (e.g., HAYNES® 214® alloy (e.g., 73-77 wt. % nickel, 14-18 wt. % chromium, 2-6 wt. % aluminum, 1-4 wt. % iron, 0-4 wt. % cobalt, 0-1wt. % manganese, 0-1 wt. % molybdenum, 0-1 wt. % titanium, 0-1 wt. % tungsten, 0-0.5 wt. % niobium, 0-0.5 wt. % Si, 0-0.3 wt. % zirconium, <0.1 wt. % carbon, <0.1 wt. % boron, <0.1 wt. % yttrium), HAYNES® 230® alloy (e.g., 55-60 wt. % nickel, 20-24 wt. % chromium, 12-16 wt. % tungsten, 0-4 wt. % molybdenum, <4 wt. % iron, <6 wt. % cobalt, 0-1 wt. % manganese, 0-1 wt. % silicon, 0-1 wt. % niobium, 0-1 wt. % aluminum, 0-0.5 wt. % titanium, <0.3 wt. % carbon), HAYNES® 233™ alloy (e.g., 46-50 wt. % nickel, 17-21 wt. % chromium, 17-21 wt. % cobalt, 6-9 wt. % molybdenum, 0-1 wt. % titanium, 2-5 wt. % aluminum, 0-3 wt. % iron, 0-1 wt. % manganese, 0-0.5 wt. % silicon, <0.1 wt. % carbon, <0.1 wt. % boron, 0-1 wt. % tantalum, 0-0.5 wt. % tungsten, <0.1 wt. % yttrium, <0.1 wt. % zirconium), HAYNES® 242® alloy (e.g., 63-72 wt. % nickel, 22-28 wt. % molybdenum, 6-10 wt. % chromium, 1-4 wt. % iron, 0-2 wt. % cobalt, 0-1 wt. % manganese, 0-1 wt. % silicon, 0-1 wt. % aluminum, <0.1 wt. % carbon, <0.05 wt. % boron), HAYNES® 244® alloy, HAYNES® 263 alloy, HAYNES® 282® alloy, HAYNES® 556® alloy, HAYNES® 617 alloy, HAYNES® 625 alloy, HAYNES® 625SQ® alloy, HAYNES® 718 alloy, HAYNES® HR-120® alloy, HAYNES® HR-160® alloy, HAYNES® HR-224® alloy, HAYNES® HR-235® alloy, HAYNES® R-41, etc.), HASTELLOY-N® alloy (e.g., 68-73 wt. % nickel, 5-8 wt. % chromium, 14-18 wt. % molybdenum, <6 wt. % iron, 0-2 wt. % silicon, 0-1 wt. % manganese, 0-1 wt. % vanadium, <0.2 wt. % carbon, <0.5 wt. % cobalt, <0.5 wt. % copper, 0-1 wt. % tungsten <0.6 wt. % aluminum, <0.6 wt. % titanium), IN600 (e.g., 68-80 wt. % nickel, 12-20 wt. % chromium, 4-12 wt. % iron, 0-1 wt. % copper, 0-2 wt. % manganese, <0.2 wt. % carbon), Nb752 (e.g., 84-91 wt. % niobium, 8-12 wt. % tungsten, 1-4 wt. % zirconium, 0-0.5 wt. % hafnium, 0-1 wt. % tantalum, <0.1 wt. % carbon), Ti6242 (e.g., 82-90 wt. % titanium, 4-8 wt. % aluminum, 3-5 wt. % zinc, 1-3 wt. % tin, 1-3 wt. % molybdenum, 0-0.5 wt. % iron, 0-0.5 wt. % silicon, <0.2 wt. % carbon), tantalum-10tungsten (e.g., 89-91 wt. % tantalum, 9-11 wt. % tungsten molybdenum-rhenium (e.g., 40-60 wt. % molybdenum, 40-60 wt. % rhenium), rhenium alloy (80-99 wt. % rhenium), etc.

In accordance with another non-limiting aspect of the present disclosure, the structured multi-phase composite can be designed for use above 700-1650° C. (and all values and ranges therebetween) surface temperature.

In accordance with another non-limiting aspect of the present disclosure, the structured multi-phase composite can optionally be coated or surface modified for corrosion/oxidation protection, and wherein the coating includes one or more materials such as iridium, platinum, rhenium, rhodium, silicides (e.g., (magnesium, geranium, tin, lead)$_2$Si, (calcium, ruthenium, cesium, rhodium, iridium, nickel)$_2$Si), MCrAl (M includes iron, nickel and/or cobalt, >50 wt. % M, 15-30 wt. % Cr, 6-12 wt. % Al), MCrAlY (M includes iron, nickel and/or cobalt, >50 wt. % M, 15-30 wt. % chromium, 6-12 wt. % aluminum, 0.1-0.5 wt. % yttrium), aluminum, and chrome-containing materials. The one or more materials can be applied to the structured multi-phase composite by pack cementation, slurry fusion, VD (vapor deposition), CVD (chemical vapor deposition), plasma spray, thermal spray, diffusion bonding, electroplating, or other application technique.

In accordance with another non-limiting aspect of the present disclosure, the structured multi-phase composite can optionally be coated with a thermal barrier coating to increase surface temperature limits by 50-250° C. (and all values and ranges therebetween). The coating thickness is generally at least 3 mils, typically 3-100 mils (and all values and ranges therebetween), more typically about 5-50 mils, and yet more typically 10-20 mils. In some non-limiting embodiment, the coating thickness can be a thick coating and function as a thermo barrier and have a thickness of 0.5-2 mm. In accordance with another non-limiting aspect of the present disclosure, the coating is a TBC coating having a thickness of about 5-20 mil (125-500 microns).

In accordance with another non-limiting aspect of the present disclosure, the structured multi-phase composite can be used as a load-bearing airframe or engine structure, such as a panel, aeroshell, isogrid, skin-stringer, ring, strut, bulkhead, or other airframe or engine component, or as an insert or heat spreader.

In accordance with another non-limiting aspect of the present disclosure, the structured multi-phase composite can be designed to reduce buckling and/or constrained thermal growth stresses by more than 30%, and typically more than 50%.

In accordance with another non-limiting aspect of the present disclosure, the structured multi-phase composite can be used to resist atmospheric heating, such as in a hypersonic launch or reentry vehicle airframe, leading edge, acreage TPS, duct, flap, seal, or other structure to resist aerodynamic heating by moving heat away from hot spots and dissipating heat from such hot spots, and/or by absorbing heat using phase change and heat spreading techniques to allow short term or focused exposures to high heat loads.

In accordance with another non-limiting aspect of the present disclosure, the structured multi-phase composite can be used to resist engine and exhaust loads, including exhaust-impinged structures, nozzles or nozzle components, flaps, rings, channels, panels, cowls, and other exhaust and engine flowpath and adjacent airframe structures and components.

In accordance with another non-limiting aspect of the present disclosure, the structured multi-phase composite can be used in molten salt storage or transfer applications, such as for a heat exchanger, resistance heater (or heater cover), superheater, or other molten salt—$CO_2$—or steam contacted component or structure, where the molten salt system can include chlorides, carbonates, nitrates, bromides, sulfides, and their mixtures.

In accordance with another non-limiting aspect of the present disclosure, the structured multi-phase composite can be used in a heat exchanger and be formed into complex channels, such a spiral, wave, microchannel, or other design for enhanced heat transfer at low pressure drop.

In accordance with another non-limiting aspect of the present disclosure, the structured multi-phase composite can be fabricated by techniques that include EDM, chemical etching, milling, or other laminate machining technique combined with brazing, diffusion bonding, spark plasma sintering, or other assembly technique to create complex structures.

In accordance with another non-limiting aspect of the present disclosure, the structured multi-phase composite can be formed into structures such as fins, dimples, rods/pins, or other enhanced heat transfer surfaces to dissipate heat, and may be connected to active or semi-active (e.g., heat pipe) systems to dissipate heat.

In accordance with another non-limiting aspect of the present disclosure, the structured multi-phase composite can be formed into panel or component intersections that have been made impermeable. The panel or component can be joined using welding processes, including arc welding, TEG welding, MIG welding, spray-welding, friction stir welding, or other metal welding technique. The panels can be mechanically attached through such techniques as rivets, bolts, retainers, clips, and other mechanical attachments.

In accordance with another non-limiting aspect of the present disclosure, the structured multi-phase composite can be formed into a standoff that is placed between the multi-phase structure or component and the load transfer structural system, such as to allow for insulation to limit heat transfer to the structure.

In accordance with another non-limiting aspect of the present disclosure, the structured multi-phase composite can optionally be designed to have ductility at room temperature (e.g., 77° F.) that is greater than about 2% strain to failure, and typically greater than about 4%, and generally in the 4-20% range.

In accordance with another non-limiting aspect of the present disclosure, the structured multi-phase composite can optionally have a ductility at cryogenic (less than 0° C.) or elevated temperatures (above 100° C.) that is greater than 2% strain to failure, generally greater than 4% strain to failure, and typically greater than 8% strain to failure.

In accordance with another non-limiting aspect of the present disclosure, the structured multi-phase composite can optionally be fabricated using powder metallurgy or casting processes. Powder metallurgy processing can include spark plasma sintering, extrusion, pressureless sintering, metal injection molding, hot pressing, press and sinter, and other techniques capable of powdered metal and metal matrix composite fabrication.

In accordance with another non-limiting aspect of the present disclosure, the structured multi-phase composite can optionally be subjected to a manufacturing process to form a near net shape of the final product.

In accordance with another non-limiting aspect of the present disclosure, the structured multi-phase composite can optionally be laminated or graded to control thermal stresses, such as by varying CTE, modulus, or thermal conductivity across the width of the panel or component.

In accordance with another non-limiting aspect of the present disclosure, there is provided a structured multi-phase composite which includes a high thermal conductivity phase and a metal phase, and wherein the high conductivity phases are segregated into isolated pockets forming a discontinuous phase in the structured multi-phase composite, and wherein the metal phase is a continuous phase in the structured multi-phase composite, and wherein the structured multi-phase composite has a combination of compression modulus and coefficient of thermal expansion that are at least 40% less than a modulus of the metal forming the metal phase, and wherein the structured multi-phase composite has a thermal conductivity that is at least 40% greater than the thermal conductivity of the metal that forms the metal phase.

In accordance with another non-limiting aspect of the present disclosure, there is provided a structured multi-phase composite wherein a plurality of the high thermal conductivity phase is 20-50 vol. % of the structured multi-phase composite, and wherein the high thermal conductivity phase includes ceramic particles that have a lower modulus than the metal forming the metal phase, and wherein the high thermal conductivity phase can be equiaxed-shaped and/or elliptical-shaped, and wherein the high thermal conductivity phase has a thermal conductivity of at least two times the thermal conductivity of the metal forming the metal phase.

In accordance with another non-limiting aspect of the present disclosure, there is provided a structured multi-phase composite wherein the high thermal conductivity phase includes one or more materials selected from the group consisting of carbon, BN, graphite or other form of carbon, and MAX-phase material.

In accordance with another non-limiting aspect of the present disclosure, there is provided a structured multi-phase composite wherein the high thermal conductivity phase includes a phase change material which undergoes a heat-absorbing phase change, such as melting or vaporization, at a temperature from 25-1500° C. (and all values and ranges therebetween).

In accordance with another non-limiting aspect of the present disclosure, there is provided a structured multi-phase composite wherein the phase change material can include a) salt or salt mixture such as, but not limited to, chlorides, borides, nitrates, and carbonates, b) an alkali metal such as, but not limited to, sodium, potassium, and cesium, c) a metal such as, but not limited to, copper, zinc, magnesium, calcium, antimony, and manganese, and/or d) an eutectic metal alloy such as, but not limited to, a metal-silicon eutectic.

In accordance with another non-limiting aspect of the present disclosure, there is provided a structured multi-phase composite wherein the high thermal conductivity phase is encapsulated with a single or multilayer shell.

In accordance with another non-limiting aspect of the present disclosure, there is provided a structured multi-phase composite wherein the shell contains a strain-absorbing material such as carbon (e.g., graphite, etc.), BN or MAX-phase material, and a hermetic outer shell such as a metal or ceramic, and wherein the ceramic can be alumina ceramics, zirconia ceramics, boron oxide ceramics, silicon nitride ceramics, sialon, carbide ceramics (e.g., SSiC, LPS-SiC, RBSiC, NSiC, SiSiC, RSiC, SiC, TiC, ZrC, $B_4C$, $TiB_2C$), or other ceramic material.

In accordance with another non-limiting aspect of the present disclosure, there is provided a structured multi-phase composite wherein said metal phase includes one or more metals selected from the group consisting of titanium, niobium, nickel, iron, molybdenum, aluminum, magnesium, copper, cobalt, or vanadium and/or alloys that includes such one or more metals.

In accordance with another non-limiting aspect of the present disclosure, there is provided a structured multi-phase composite wherein the high thermal conductivity phase optionally forms about 15-50 vol. % (and all values and ranges therebetween) of the structured multi-phase composite.

In accordance with another non-limiting aspect of the present disclosure, there is provided a structured multi-phase composite wherein the metallic phase also optionally incorporates 1-20 vol. % (and all values and ranges therebetween) additional phases such as, but not limited to, ceramic or intermetallic phases.

In accordance with another non-limiting aspect of the present disclosure, there is provided a structured multi-phase composite wherein at least a portion of the high thermal conductivity phase is optionally coated with a metal material prior to formation of the structured multi-phase composite.

In accordance with another non-limiting aspect of the present disclosure, there is provided a structured multi-phase composite that is designed for use above 700° C.

In accordance with another non-limiting aspect of the present disclosure, there is provided a structured multi-phase composite that is designed for use above 1000° C.

In accordance with another non-limiting aspect of the present disclosure, there is provided a structured multi-phase composite that is designed for use above 1200° C.

In accordance with another non-limiting aspect of the present disclosure, there is provided a structured multi-phase composite that is designed for use above 1500° C.

In accordance with another non-limiting aspect of the present disclosure, there is provided a structured multi-phase composite that includes optionally a coating or surface modification on an outer surface of the structured multi-phase composite to improve corrosion/oxidation protection of the structured multi-phase composite, and wherein the coating includes one or more materials selected from the group of iridium, platinum, rhenium, rhodium, silicides, MCrAl, MCrAlY, aluminum, aluminum alloy, and chrome-containing materials.

In accordance with another non-limiting aspect of the present disclosure, there is provided a structured multi-phase composite that includes a coating or surface modification on an outer surface of the structured multi-phase composite and wherein the coating or surface modification is applied by pack cementation, slurry fusion, VD, CVD, plasma spray, thermal spray, cold spray, friction cladding, roll-bonding, roll-cladding, brazing, electroplating, or other application technique.

In accordance with another non-limiting aspect of the present disclosure, there is provided a structured multi-phase composite that includes a coating or surface modification on an outer surface of the structured multi-phase composite and wherein the coating or surface modification is applied by a process that creates a bond between said coating and said outer surface of said composite that is at least 5000 psig strength, and typically by a coating process that forms a metallurgical bond between said coating and said composite.

In accordance with another non-limiting aspect of the present disclosure, there is provided a structured multi-phase composite that includes a coating or surface modification on an outer surface of the structured multi-phase composite and wherein the coating or surface modification is used to increase surface temperature limits of the structured multi-phase composite by at least about 50-250° C. (and all values and ranges therebetween).

In accordance with another non-limiting aspect of the present disclosure, there is provided a structured multi-phase composite used to integrate a ceramic leading edge into a lower temperature structure.

In accordance with another non-limiting aspect of the present disclosure, there is provided a structured multi-phase composite to form a heat exchanger structure.

In accordance with another non-limiting aspect of the present disclosure, there is provided a structured multi-phase composite to spread and/or dissipate heat to reduce peak temperatures.

In accordance with another non-limiting aspect of the present disclosure, there is provided a structured multi-phase composite used between a heat source and an insulating support or backing structure.

In accordance with another non-limiting aspect of the present disclosure, there is provided a structured multi-phase composite designed to reduce buckling and/or constrained thermal growth stresses by more than about 30%, and typically more than about 50%.

In accordance with another non-limiting aspect of the present disclosure, there is provided a structured multi-phase composite designed to reduce stresses and temperatures in an engine environment, such as piston or piston liner, engine duct, combustor, or exhaust.

In accordance with another non-limiting aspect of the present disclosure, there is provided a structured multi-phase composite designed to resist atmospheric heating in such as, but not limited to, a hypersonic launch or reentry vehicle airframe, leading edge, acreage TPS, duct, flap, seal, or other structure to resist aerodynamic heating.

In accordance with another non-limiting aspect of the present disclosure, there is provided a structured multi-phase composite designed to resist engine and exhaust loads such as, but not limited to, exhaust-impinged structures, nozzles or nozzle components, flaps, rings, channels, panels, cowls, and other exhaust and engine flowpath and adjacent airframe structures and components.

In accordance with another non-limiting aspect of the present disclosure, there is provided a structured multi-phase composite designed for use in molten salt storage or transfer applications such as, but not limited to, a heat exchanger or molten salt tank lining, and wherein the molten salt system can include one or more of chlorides, carbonates, nitrates, bromides, sulfides, and their mixtures.

In accordance with another non-limiting aspect of the present disclosure, there is provided a structured multi-phase composite wherein an outer surface of the structured multi-phase composite includes insulation, and wherein such insulation can be rigid or flexible, and wherein the insulation can include one or more materials selected from the group consisting of zirconia, stabilized zirconia, mullite, aluminosilicate, BAS, EBC (environmental barrier coating—ceramic matrix composites, metal coatings, etc.), or other thermal barrier-type coating.

In accordance with another non-limiting aspect of the present disclosure, there is provided a structured multi-phase composite designed to be supported by and attached to a steel, superalloy, nickel-based alloy, titanium, aluminum, or other low cost structural support to transfer loads to the ground, vehicle, tank, airframe, or between components or panels.

In accordance with another non-limiting aspect of the present disclosure, there is provided a structured multi-phase composite designed to form panel or component intersections that are impermeable, and wherein the panel or component intersections are formed by panels or components that have been joined using liquid or solid state welding processes, including arc welding, TIG welding, MIG welding, spray welding, friction stir welding, spark plasma sinter-welding, diffusion bonding, liquid enhanced diffusion bonding, brazing, or other metal welding technique.

In accordance with another non-limiting aspect of the present disclosure, there is provided a structured multi-phase composite that is mechanically attached to other structures by techniques such as rivets, bolts, retainers, inserts, brazed insert, metallic washer seals, metal compression seals, clips, and other mechanical attachments.

In accordance with another non-limiting aspect of the present disclosure, there is provided a structured multi-phase composite designed to be used with a standoff that has been placed between a higher temperature component, such as a leading edge, and a load-bearing structural system, to remove, spread, and/or dissipate thermal energy to reduce overall system temperatures and/or control thermal stresses.

In accordance with another non-limiting aspect of the present disclosure, there is provided a structured multi-phase composite that has a ductility at room temperature ($25°$ C.) that is greater than about 2% strain to failure, and typically at least about 4%, and more typically about 4-20%.

In accordance with another non-limiting aspect of the present disclosure, there is provided a structured multi-phase composite that is fabricated using powder metallurgy or casting processes.

In accordance with another non-limiting aspect of the present disclosure, there is provided a structured multi-phase composite that is manufactured by a process to form a near net shape.

In accordance with another non-limiting aspect of the present disclosure, there is provided a structured multi-phase composite that is laminated or graded to control thermal stresses, such as by varying CTE, modulus, or thermal conductivity across the width of the panel or component.

In accordance with another non-limiting aspect of the present disclosure, there is provided a method for forming a multi-phase composite comprising: a) providing a metal material to form the metal phase; b) providing a high thermal conductivity material, wherein i) the high thermal conductivity material has at least 40% higher thermal conductivity than the metal used to form the metal phase, and at least a 20% lower modulus than the metal material of the metal phase, and ii) the high thermal conductivity material includes a phase change material which melts or vaporizes at a preselected temperature; and c) consolidating the high thermal conductivity material with said metal material to form a multi-phase composite; and wherein the high thermal conductivity material is discontinuous in the multi-phase composite, the metal phase is continuous phase in the multi-phase composite, the multi-phase composite has a modulus that is at least 25% less than a modulus of the metal forming the metal phase, and the multi-phase composite has a thermal conductivity that is at least 40% greater than a thermal conductivity of the metal that forms the metal phase.

In accordance with another non-limiting aspect of the present disclosure, there is provided a method for forming a multi-phase composite including the step of coating at least a portion of the high thermal conductivity material with a metal-coating material prior to the step of consolidating, and wherein the metal-coating material has a different composition from the metal material used to form the metal phase.

In accordance with another non-limiting aspect of the present disclosure, there is provided a method for forming a multi-phase composite including the step of coating the outer surface of the multi-phase composite with an outer-coating material.

In accordance with another non-limiting aspect of the present disclosure, there is provided a method for forming the multi-phase composite into a panel, and wherein the panel is attached to an insulating structure or layer, and wherein the panel may be machined, etched, or otherwise formed into a channel structure and assembled with additional panels into a final assembly with multiple channels that can accommodate flow, and wherein the panels are joined using spark plasma sintering, brazing, diffusion bonding, liquid enhanced diffusion bonding, isostatic pressing, or hot pressing.

In accordance with another non-limiting aspect of the present disclosure, there is provided a method for forming the multi-phase composite for use as or in one or more structures selected from the group consisting of a load-bearing airframe structure, a hypersonic launch or reentry vehicle airframe, thermal transition piece, leading edge, acreage TPS, duct, flap, seal, or other structure to resist aerodynamic heating, exhaust-impinged structures, nozzles or nozzle components, flaps, rings, channels, panels, cowls, and other exhaust and engine flowpath and adjacent airframe structures and components, a heat exchanger, a molten salt contacted component or structure, a valve structure, or jet blast deflector panel.

In accordance with another non-limiting aspect of the present disclosure, there is provided a structured multi-phase composite which includes a metal phase and a filler. The metal phase includes metal alloys having a metaling point of greater than 1000° C. The metal phase forms about 35-90 vol. % (and all values and ranges therebetween) of the structured multi-phase composite, and typically 40-80 vol. % of the structured multi-phase composite. The filler includes include, but are not limited to, hexagonal boron nitride, cubic boron nitride, diamond, graphite, MAX-phase materials, carbon, ceramics (e.g., alumina ceramics, zirconia ceramics, boron oxide ceramics, silicon nitride ceramics, sialon, carbide ceramics (e.g., SSiC, LPS-SiC, RBSiC, NSiC, SiSiC, RSiC, SiC, TiC, ZrC, $B_4C$, $TiB_2C$); ceramic-encapsulated materials (e.g., ceramic coated with copper, ceramic coated with zinc, ceramic coated with barium, ceramic coated with calcium, ceramic coated with cerium, ceramic coated with nickel, ceramic coated with manganese, ceramic coated with magnesium, ceramic-coated aluminum, ceramic coated with glass, ceramic coated with metal salts (e.g., nitrates, chlorides, flourides, bromides, etc.)); metal-encapsulated metals that included metals such as, but not limited to, copper, zinc, boron, barium, calcium, cerium, magnesium, nickel and/or aluminum; and/or metal coated materials (e.g., metal-coated glasses, metal-coated metal salts)). The filler can be coated with a reaction control layer such as tungsten, HfN, ZrN, TiC, TiCN, ZrCN, ZrC, NbC, WC, and/or an active metal or eutectic forming metal wetting agent such as copper, zinc, boron, barium, calcium, cerium, magnesium, nickel, titanium, silicon, and/or aluminum. The filler forms about 10-65 vol. % of the structured multi-phase composite, and typically about 20-50 vol. % of the structured multi-phase composite. The filler is selected to maintain a distinct phase in the structured multi-phase composite. When the filler includes or is formed of a metal, the metal of the filler (not including any metal coating on the filler) has a solubility in the metal phase of less than about 10% (e.g., 0-10% and all values and ranges therebetween).

One non-limiting object of the present disclosure is the provision of a structured multi-phase composite which includes a metal phase, a ceramic phase, and/or a phase change phase that are arranged to create high thermal conductivity or heat capacity, have controlled stiffness, and CTE to reduce thermal stresses in the structure when exposed to cyclic thermal loads.

Another non-limiting object of the present disclosure is the provision of a structured multi-phase composite that has reduced stiffness, reduced thermal conductivity, and a CTE for use in thermally-loaded structures.

Another non-limiting object of the present disclosure is the provision of a structured multi-phase composite that exhibits a dramatic reduction in modulus and thermal conductivity and a modest reduction in thermal expansion, while retaining good strength, toughness, and ductility of the engineering metals.

Another non-limiting object of the present disclosure is the provision of a structured multi-phase composite that allow stress states to be controlled and minimized at attachment/dissimilar materials integration points, while providing highly efficient heat transfer and/or dissipation.

Another non-limiting object of the present disclosure is the provision of a structured multi-phase composite that exhibits (as compared to conventional metals) reduced CTE, increased thermal conductivity or heat sink capabilities, reduced modulus, reduced density, and/or improved damage tolerance and impact resistance.

Another non-limiting object of the present disclosure is the provision of a structured multi-phase composite that is used in hot structure (load-bearing) applications that exhibits reduced mean free (average) structure temperature, improved specific stiffness and buckling strength, reduced thermal stresses, >50% reduction in thermomechanical stresses, reduced system density/mass, ease of integration (insulating structural standoffs), and/or ease of assembly and fabrication (formable, threadable, braze/weldable, etc.).

Another non-limiting object of the present disclosure is the provision of a structured multi-phase composite that enables a low-cost, scalable design and the ability to manufacture computationally-engineered, multifunctional (syntactic composite) material hot structure systems for thermal system structures to dramatically reduce dry weight and cost of future hypersonic systems, molten salt and thermal-energy storage systems, exhaust-impinged airframe structures, engine components, and other hot structures.

Another non-limiting object of the present disclosure is the provision of a structured multi-phase composite formulated to resolve constrained thermal growth stresses and prevent ceramic leading edge failure (by maintaining compressive stress states in ceramic, and removing heat from the ceramic), reduce parasitic mass, and resolve problems associated with hot structures that can carry large thermal gradients.

Another non-limiting object of the present disclosure is the provision of a structured multi-phase composite that is weldable, brazeable, and/or boltable.

Another non-limiting object of the present disclosure is the provision of a structured multi-phase composite that negates or reduces the problems typically found with the creation of thermally-stressed structures such as hypersonic vehicles, engines, and thermal energy storage systems.

Another non-limiting object of the present disclosure is the provision of a structured multi-phase composite that typically has a >40% higher thermal conductivity than the metal used to form the metal phase.

Another non-limiting object of the present disclosure is the provision of a structured multi-phase composite that typically has a density at least 20% lower than the metal used to form the metal phase.

Another non-limiting object of the present disclosure is the provision of a structured multi-phase composite that is coated or surface modified for corrosion/oxidation protection, and wherein the coating includes one or more materials such as iridium, platinum, rhenium, rhodium, silicides, MCrAl, MCrAlY, aluminum, and chrome-containing materials.

Another non-limiting object of the present disclosure is the provision of a structured multi-phase composite that is coated by pack cementation, slurry fusion, VD, CVD, plasma spray, thermal spray, electroplating, or other application technique.

Another non-limiting object of the present disclosure is the provision of a structured multi-phase composite that is coated with a thermal barrier coating to increase surface temperature limits by 50-250° C.

Another non-limiting object of the present disclosure is the provision of a structured multi-phase composite used as a load-bearing airframe structure, such as a panel, aeroshell, isogrid, skin-stringer, ring, strut, bulkhead, or other airframe component.

Another non-limiting object of the present disclosure is the provision of a structured multi-phase composite that is designed to reduce buckling and/or constrained thermal growth stresses by more than 30%, and typically more than 50%.

Another non-limiting object of the present disclosure is the provision of a structured multi-phase composite that is used to resist atmospheric heating, such as in a hypersonic launch or reentry vehicle airframe, leading edge, acreage TPS, duct, flap, seal, or other structure to resist aerodynamic heating.

Another non-limiting object of the present disclosure is the provision of a structured multi-phase composite used to resist engine and exhaust loads, including exhaust-impinged structures, nozzles or nozzle components, flaps, rings, channels, panels, cowls, and other exhaust and engine flowpath and adjacent airframe structures and components.

Another non-limiting object of the present disclosure is the provision of a structured multi-phase composite that is used in molten salt storage or transfer applications, such as for a heat exchanger or other molten salt-contacted component or structure, where the molten salt system can include chlorides, carbonates, nitrates, bromides, sulfides, and their mixtures.

Another non-limiting object of the present disclosure is the provision of a structured multi-phase composite that includes a corrosion-resistant coating that can be applied by thermal spray, cold spray, friction cladding, roll-bonding, roll-cladding, brazing, or other attachment technique that creates an intimate bond, generally defined as above 5000 psig strength, and typically a metallurgical bond, with the underlying metal in the structured multi-phase composite.

Another non-limiting object of the present disclosure is the provision of a structured multi-phase composite wherein said ceramic phase is at least partially formed of and/or includes one or more materials selected from the group consisting of carbon, BN (boron nitride), graphene, carbon nanotubes (CNT), BNNT (boron nitride nanotubes), AlN (aluminum nitride), $Ti_2SiC$, and/or MAX-phase material, wherein such materials can be agglomerated and sintered prior to incorporation, using various bonding agents (oxides, carbon, metals, salts) to form 10-400 micron size thermally engineered fillers. Of particular use is to combine high thermal conductivity nanofillers or whiskers, with low CTE materials such as $ZrW_2O_8$, beta-eucryptite ($LiAlSiO_4$), or $ScF_3$. Another non-limiting object of the present disclosure is the provision of a structured multi-phase composite wherein said phase change material includes one or more solids selected from the group consisting of metals, salts, and their mixtures.

Another non-limiting object of the present disclosure is the provision of an engineered multi-phase composite which includes a high thermal conductivity phase and a metal phase, and wherein said high conductivity phase is segregated into isolated pockets forming a discontinuous phase having equivalent spherical dimensions from 10-400 microns in size and from 20-60 vol. % in said engineered multi-phase composite, said metal phase is a continuous phase in said engineered multi-phase composite, said engineered multi-phase composite has a thermal conductivity that is at least 40% greater than the thermal conductivity of said metal that forms said metal phase.

Another non-limiting object of the present disclosure is the provision of an engineered multi-phase composite wherein said high thermal conductivity phase constitutes 20-50 vol. % of said engineered multi-phase composite, said high thermal conductivity phase is optionally formed of ceramic particles that have a lower modulus than said metal forming said metal phase, said high thermal conductivity phase is optionally equiaxed or elliptical, said high thermal conductivity phase optionally has a thermal conductivity at least two times said metal forming said metal phase, said high thermal conductivity phase optionally has a coefficient of thermal expansion (CTE) at least 10% less than the CTE of the metal forming said metal phase.

Another non-limiting object of the present disclosure is the provision of an engineered multi-phase composite wherein said high thermal conductivity phase includes ceramic particles and agglomerated or bonded agglomerate particles of 15-400 micron in size, said ceramic particles include one or more materials selected from the group consisting of carbon, hexagonal boron nitride, graphene, carbon nanotubes, diamond, cubic boron nitride, boron nitride nanosheets (BNNS) silicon carbide, aluminum nitride, graphite or other form of carbon, MAX phase including $V_2AlC$, $Ti_2AlC$, $Ti_3SiC_2$, and $Ti_3(Si_{0.5}Ge_{0.5})C_2$.

Another non-limiting object of the present disclosure is the provision of an engineered multi-phase composite wherein the bonded agglomerates contain a high thermal conductivity phase and additionally a low coefficient of thermal expansion (CTE) phase, where said low CTE phase may include $ZrW_2O_8$, $ScF_3$, $LiAlSiO_4$, or other low CTE phase.

Another non-limiting object of the present disclosure is the provision of an engineered multi-phase composite which also contains a binder phase, which can include carbon, polymer derived carbon, $Bi_2O_3$, $SiO_2$, $LiAlSiO_4$, or $TiO_2$ as a binder.

Another non-limiting object of the present disclosure is the provision of an engineered multi-phase composite wherein said high thermal conductivity phase includes a phase change material, said phase change material undergoes a heat-absorbing phase change such as melting or vaporization at a temperature of 250-1500° C.

Another non-limiting object of the present disclosure is the provision of an engineered multi-phase composite wherein said phase change material is selected from a) a salt or salt mixture, said salt or salt mixture includes chlorides, borides, nitrates, and/or carbonates, b) an alkali metal, said alkali metal includes sodium, potassium, and/or cesium, c) an intermediate or low temperature meltable metal or alloy, said meltable metal or alloy includes copper, tin, bismuth, zinc, magnesium, aluminum, calcium, sodium, silver, gold, antimony, and/or manganese, and/or d) an eutectic metal alloy, said eutectic metal alloy includes a metal-silicon eutectic, a zinc eutectic, and aluminum eutectic, or an iron eutectic.

Another non-limiting object of the present disclosure is the provision of an engineered multi-phase composite wherein said high thermal conductivity phase is encapsulated with a single or multilayer shell.

Another non-limiting object of the present disclosure is the provision of an engineered multi-phase composite wherein said shell contains a strain absorbing material such as carbon or MAX phase, and a hermetic outer shell such as a metal or ceramic or combination thereof, and wherein said metal include one or more of nickel, cobalt, iron, titanium, aluminum, and chromium, and wherein said ceramic can be one or more of SiC, $Si_3N_4$, alumina, nitrides, and carbides.

Another non-limiting object of the present disclosure is the provision of an engineered multi-phase composite wherein said metal phase includes one or more metals selected from the group consisting of titanium, niobium, nickel, iron, molybdenum, aluminum, magnesium, copper, cobalt, or vanadium and alloys that includes such metals.

Another non-limiting object of the present disclosure is the provision of an engineered multi-phase composite wherein said high thermal conductivity phase forms 15-50 vol. % of said engineered multi-phase composite.

Another non-limiting object of the present disclosure is the provision of an engineered multi-phase composite wherein said metallic phase also incorporates 1-20 vol. % of additional phases such as ceramic and/or intermetallic phases for further modifying thermal and mechanical properties of said multi-phase composite, wherein properties include elasticity, modulus, strength, density, hardness, corrosion resistance, thermal expansion (CTE), heat capacity, magnetic properties, and electrical properties.

Another non-limiting object of the present disclosure is the provision of an engineered multi-phase composite wherein said additional phases include one or more filler additive particles, said additive particles include metals or ceramics or combinations thereof, wherein said metal can be nickel, aluminum, iron, chromium, cobalt, molybdenum, niobium, tungsten, titanium, zirconium, copper, hafnium, and alloys thereof, wherein said ceramic can be graphite, carbides, nitrides, shape memory particles, $Cu_2O$, $ZrWO_3$, beta-eucryptite, $LiAlSiO_4$, $ZrO_2$-$ZrWO_3$, CNT, CNF, $Hf(WO_4)_3$, $Mg(WO_4)_3$, $ZrW_2O_8$, $ZrMo_2O_8$, $HfW_2O_8$, $HfMo_2O_8$, Zeolites, $AlPO_4$, $ScF_3$, $HfV_2O_7$, $ZrV_2O_7$, $Zr_2(MoO_4)_3$, $CeP_2O_7$, $AuP_2O_7$, $ScF_3$, carbon nanotubes, graphene, boron nitride nanosheets, boron nitride nanotubes, cordierite, SiC, Allvar, wherein said metal or ceramic particles can be hollow spheres, rods, spherical, oblong, abnormal of sizes ranging from $1/10^{th}$ to 2 times the size of said high thermal conductivity phase.

Another non-limiting object of the present disclosure is the provision of an engineered multi-phase composite wherein at least a portion of said high thermal conductivity phase is coated with one or more of a metal or ceramic material prior to formation of said engineered multi-phase composite, intended to engineer matrix interface compatibility.

Another non-limiting object of the present disclosure is the provision of an engineered multi-phase composite wherein said high thermal conductivity phase coating or encapsulation is applied by milling, ALD, CVD, spray drying, fluid-bed spray coating, solution-based chemical modification or adsorption, or other application techniques.

Another non-limiting object of the present disclosure is the provision of an engineered multi-phase composite wherein said engineered multi-phase composite is designed for use above 700° C. surface temperatures.

Another non-limiting object of the present disclosure is the provision of an engineered multi-phase composite wherein said engineered multi-phase composite is designed for use above 1000° C. surface temperatures.

Another non-limiting object of the present disclosure is the provision of an engineered multi-phase composite wherein said engineered multi-phase composite is designed for use above 1200° C. surface temperatures.

Another non-limiting object of the present disclosure is the provision of an engineered multi-phase composite wherein said engineered multi-phase composite is designed for use above 1500° C. surface temperatures.

Another non-limiting object of the present disclosure is the provision of an engineered multi-phase composite wherein said further includes a coating or surface modification on an outer surface of said engineered multi-phase composite to improve corrosion/oxidation protection of said engineered multi-phase composite, said coating includes one or more materials selected from the group of iridium, platinum, rhenium, rhodium, silicides, MCrAl, MCrAlY, aluminum, aluminum alloy, and chrome-containing materials.

Another non-limiting object of the present disclosure is the provision of an engineered multi-phase composite wherein said coating or surface modification is applied by pack cementation, slurry fusion, VD, CVD, plasma spray, thermal spray, cold spray, friction cladding, roll-bonding, roll-cladding, brazing, electroplating, or other application technique.

Another non-limiting object of the present disclosure is the provision of an engineered multi-phase composite wherein said coating is applied by a process that creates a bond between said coating and said outer surface of said composite that is at least 5000 psig strength, and typically by a coating process that forms a metallurgical bond between said coating said composite.

Another non-limiting object of the present disclosure is the provision of an engineered multi-phase composite wherein said further includes a coating or surface modification on an outer surface of said engineered multi-phase composite to increase surface temperature limits of said engineered multi-phase composite by at least about 50-250° C.

Another non-limiting object of the present disclosure is the provision of an engineered multi-phase composite wherein said engineered multi-phase composite integrates a ceramic leading edge into a lower temperature structure.

Another non-limiting object of the present disclosure is the provision of an engineered multi-phase composite wherein said engineered multi-phase composite forms a heat exchanger structure.

Another non-limiting object of the present disclosure is the provision of an engineered multi-phase composite wherein said engineered multi-phase composite spreads and/or dissipates heat to reduce peak temperatures.

Another non-limiting object of the present disclosure is the provision of an engineered multi-phase composite wherein said engineered multi-phase composite is used between a heat source and an insulating support or backing structure.

Another non-limiting object of the present disclosure is the provision of an engineered multi-phase composite wherein said engineered multi-phase composite is designed to reduce buckling and/or constrained thermal growth stresses by more than about 30%, and typically more than about 50%.

Another non-limiting object of the present disclosure is the provision of an engineered multi-phase composite wherein said engineered multi-phase composite reduces stresses and temperatures in an engine environment, such as piston or piston liner, engine duct, combustor, or exhaust.

Another non-limiting object of the present disclosure is the provision of an engineered multi-phase composite wherein said engineered multi-phase composite is designed to resist atmospheric heating in such as, but not limited to, a hypersonic launch or reentry vehicle airframe, leading edge, acreage TPS, duct, flap, seal, or other structure to resist aerodynamic heating.

Another non-limiting object of the present disclosure is the provision of an engineered multi-phase composite wherein said engineered multi-phase composite is designed to resist engine and exhaust loads such as, but not limited to, exhaust-impinged structures, nozzles or nozzle components, flaps, rings, channels, panels, cowls, and other exhaust and engine flowpath and adjacent airframe structures and components.

Another non-limiting object of the present disclosure is the provision of an engineered multi-phase composite wherein said engineered multi-phase composite is designed for use in molten salt storage or transfer applications such as, but not limited to, a heat exchanger or molten salt tank lining.

Another non-limiting object of the present disclosure is the provision of an engineered multi-phase composite wherein said molten salt system can include one or more of chlorides, carbonates, nitrates, bromides, sulfides, and their mixtures.

Another non-limiting object of the present disclosure is the provision of an engineered multi-phase composite wherein an outer surface of said engineered multi-phase composite includes insulation, and wherein such insulation can be rigid or flexible.

Another non-limiting object of the present disclosure is the provision of an engineered multi-phase composite wherein said insulation includes one or more materials selected from the group consisting of zirconia, stabilized zirconia, mullite, aluminosilicate, BAS, EBC (environmental barrier coating), or other thermal barrier type coating.

Another non-limiting object of the present disclosure is the provision of an engineered multi-phase composite wherein said engineered multi-phase composite is designed to be supported by and attached to a steel, superalloy, nickel-based alloy, titanium, aluminum or other low cost structural support to transfer loads to the ground, vehicle, airframe, or between components or panels.

Another non-limiting object of the present disclosure is the provision of an engineered multi-phase composite wherein said engineered multi-phase composite is designed to form panel or component intersections that are impermeable.

Another non-limiting object of the present disclosure is the provision of an engineered multi-phase composite wherein said panel or component intersections are formed by panels or components that have been joined using liquid or solid state welding processes, including arc welding, TEG welding, MIG welding, spray welding, friction stir welding, spark plasma sinter-welding, diffusion bonding, liquid enhanced diffusion bonding, brazing, or other metal welding technique.

Another non-limiting object of the present disclosure is the provision of an engineered multi-phase composite wherein said engineered multi-phase composite is mechanically attached to other structures by techniques such as rivets, bolts, retainers, inserts, brazed insert, metallic washer seals, metal compression seals, clips, and other mechanical attachments.

Another non-limiting object of the present disclosure is the provision of an engineered multi-phase composite wherein said engineered multi-phase composite is designed to be used with a standoff that has been placed between a higher temperature component (such as a leading edge) and a load-bearing structural system, to remove, spread, and/or dissipate thermal energy to reduce overall system temperatures and/or control thermal stresses.

Another non-limiting object of the present disclosure is the provision of an engineered multi-phase composite wherein said engineered multi-phase composite has a ductility at room temperature (25° C.) that is greater than about 2% strain to failure, and typically at least about 4%, and more typically about 4-20%.

Another non-limiting object of the present disclosure is the provision of an engineered multi-phase composite wherein said engineered multi-phase composite is fabricated using powder metallurgy or casting processes.

Another non-limiting object of the present disclosure is the provision of an engineered multi-phase composite wherein said engineered multi-phase composite is manufactured by a process to form a near net shape.

Another non-limiting object of the present disclosure is the provision of an engineered multi-phase composite wherein said engineered multi-phase composite is laminated or graded to control thermal stresses, such as by varying CTE, modulus, or thermal conductivity across the width of the panel or component.

Another non-limiting object of the present disclosure is the provision of a method for forming an engineered multi-phase composite comprising: a) providing a metal material to form a metal phase; b) providing a high thermal conductivity material wherein i) said high thermal conductivity material has at least 40% higher thermal conductivity than said metal phase; and, ii) said high thermal conductivity material contains a low CTE material; and, c) consolidating said high thermal conductivity material with said metal material to form said engineered multi-phase composite, wherein the high conductivity and low CTE materials may be combined into a composite particle, and wherein said phase form by said high thermal conductivity material is discontinuous in said engineered multi-phase composite, said metal phase is continuous phase in said engineered multi-phase composite, said engineered multi-phase composite has a CTE that is at least 10% less than the CTE of said metal forming said metal phase, said engineered multi-phase composite has a thermal conductivity that is at least 40% greater than a thermal conductivity of said metal that forms said metal phase.

Another non-limiting object of the present disclosure is the provision of a method for forming an engineered multi-phase composite wherein at least a portion of said high thermal conductivity material is coated with a metal-coating material prior to said step of consolidating.

Another non-limiting object of the present disclosure is the provision of a method for forming an engineered multi-phase composite wherein said metal-coating material has a different composition from said metal material that forms said metal phase.

Another non-limiting object of the present disclosure is the provision of a method for forming an engineered multi-phase composite wherein said engineered multi-phase composite is coated with an outer coating material.

Another non-limiting object of the present disclosure is the provision of a method for forming an engineered multi-phase composite wherein said engineered multi-phase composite is formed into a thermal managing part.

Another non-limiting object of the present disclosure is the provision of a method for forming an engineered multi-phase composite wherein said thermal managing part is attached to an insulating structure or layer.

Another non-limiting object of the present disclosure is the provision of a method for forming an engineered multi-phase composite wherein said thermal managing part is machined, etched, or otherwise formed into a channel structure and assembled with additional panels into a final assembly with multiple channels that can accommodate flow.

Another non-limiting object of the present disclosure is the provision of a method for forming an engineered multi-phase composite wherein said thermal managing parts are joined using spark plasma sintering, brazing, diffusion bonding, liquid enhanced diffusion bonding, isostatic pressing, or hot pressing.

Another non-limiting object of the present disclosure is the provision of a method for forming said engineered multi-phase composite for use as or in one or more structures selected from the group consisting of a load-bearing airframe structure, a hypersonic launch or reentry vehicle airframe, thermal transition piece, leading edge, acreage TPS, duct, flap, seal, or other structure to resist aerodynamic heating, exhaust-impinged structures, nozzles or nozzle components, flaps, rings, channels, panels, cowls, and other exhaust and engine flowpath and adjacent airframe structures and components, a heat exchanger, a molten salt contacted component or structure, a valve structure, a pump component, or jet blast deflector panel.

These and other advantages of the present disclosure will become more apparent to those skilled in the art from a review of the description of the preferred embodiment and claims.

BRIEF DESCRIPTION OF THE DRAWINGS

Reference may now be made to the drawings, which illustrate various embodiments that the present disclosure may take in physical form and in certain parts and arrangements of parts wherein.

DETAILED DESCRIPTION OF THE PRESENT DISCLOSURE

Figure 1:
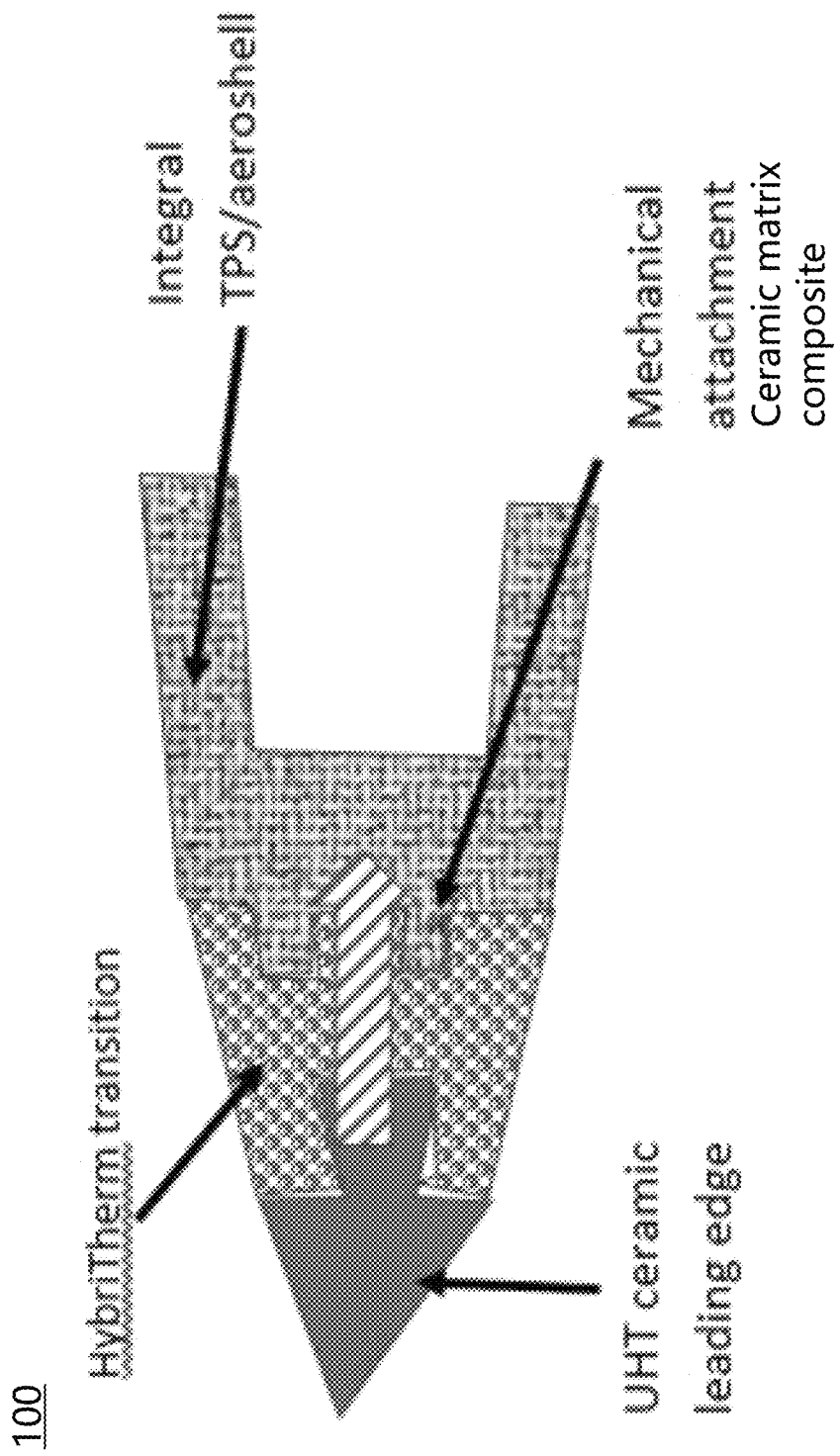
FIG. 1 illustrates a conceptual design of sharp leading edge integration enabled through thermally tailored syntactic metal matrix composites in accordance with the present disclosure.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the present disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

The present disclosure pertains to the design and materials of construction of structures in which thermal or other strain-induced loads (such as constrained thermal growth and thermal gradient loads) contribute a large portion of the stresses. In particular, the present disclosure pertains to a structured multi-phase composite which includes a metal, a ceramic, and/or a phase change material that is arranged to create a higher thermal conductivity, have controlled stiffness, and a controlled CTE to reduce thermal stresses in the structure when exposed to cyclic thermal loads. The structured multi-phase composite is useful for use in structures such as, but not limited to, heat exchangers, high speed engine ducts, exhaust-impinged structures, and high speed and reentry aeroshells.

The structured multi-phase composite typically has reduced stiffness, increased thermal conductivity or improved heat sink capabilities, and/or a CTE that is appropriate for use in thermally-loaded structures. The present disclosure advances current hot structure designs and incorporates a multifunctional (thermally-engineered/thermally-conductive) structured multi-phase composite, replacing pure ceramic or heavy heat sink or expensive actively-cooled structures with a passive thermal management structure. The structured multi-phase composite serves as a load-bearing structural element and can optionally be stiffened with ribs and/or supports, or optionally engineered with surfaces to enhance heat dissipation via convection or radiation. The structured multi-phase composite can optionally be constructed as panels that are attached to a frame, or as an isogrid or skin-stringer or other J-stiffened panel construction or I-stiffened panel construction. These types of constructions can be used to reduce or eliminate the large costs, reliability concerns, and fabrication difficulties (e.g., complex curved panels, etc.) of ceramics and ceramic composites. The structured multi-phase composite has very high thermal conductivity (e.g., 4.6 g/cc IN625 structured multi-phase composite has thermal conductivity approaching/ equivalent to aluminum or SiC ceramic) and can be engineered with low modulus to reduce thermal stress and thermal distortion/deformation. The use of the structured multi-phase composite of the present disclosure can result in a tremendous advantage for use in multifunctional materials. Because a portion of the materials used in the structured multi-phase composite are metallic and have low flaw sensitivity (particularly at elevated temperatures), they can be threaded, bolted, riveted, and assembled using techniques used for the last 100 years of aviation structures.

Non-Limiting Application For High Temperature TPS

One non-limiting application of the structured multi-phase composite is used as a multifunctional material suitable for integration of ultra-high temperature (UHT) ceramic leading edges into integral structural thermal protection systems (aeroshells) systems. UHT ceramics (e.g., boride-SiC-silicide composites) enable sharp leading edges that enable good aerodynamic stability, but have significant integration, reliability, and cost issues. The structured multi-phase composite of the present disclosure provides a solution to extract and spread heat, but that can also simultaneously manage thermal growth and thermal gradient strains. The thermally-engineered, structured multi-phase composite is based on syntactic metal matrix composites (SMMCs) that can be engineered specifically for managing extreme thermal stress environments such as, but not limited to, hypersonic vehicle structures. The thermally-engineered structured multi-phase composite can be designed as a transition material between UHT leading edges and integral TPS structures. The structured multi-phase composite can be designed for 850-1500° C. applications that can extract and spread heat while managing thermal growth stresses to maintain the ceramic leading edge in compression throughout the flight profile.

FIG. 1 illustrates a non-limiting leading edge integration design 100 and the location of the hybrid thermal structured multi-phase composite ("HybriTherm") materials. FIG. 1 illustrates a conceptual design of sharp leading edge integration enabled through thermally-tailored syntactic metal matrix composites. The integration requires high thermal conductivity, while the aeroshell is low conductivity.

Designing a compact and affordable hypersonic vehicle imposes serious demands on the combined structural weight of the vehicle itself and the associated thermal protection system (TPS). Emphasis is placed on the structure's strength and achieving the lowest mass and thermal conductivity (of the acreage structure) to maximize payload and affordability, while solving attachment, reliability (due to thermal stresses/strains and use of ceramic materials), and integration issues that have plagued TPS systems. The thermally-engineered multi-phase composite of the present disclosure enables integration of sharp leading edge structures utilizing UHTC ceramic inserts into a high thermal conductivity, controlled thermal strain integration material.

Figure 2:
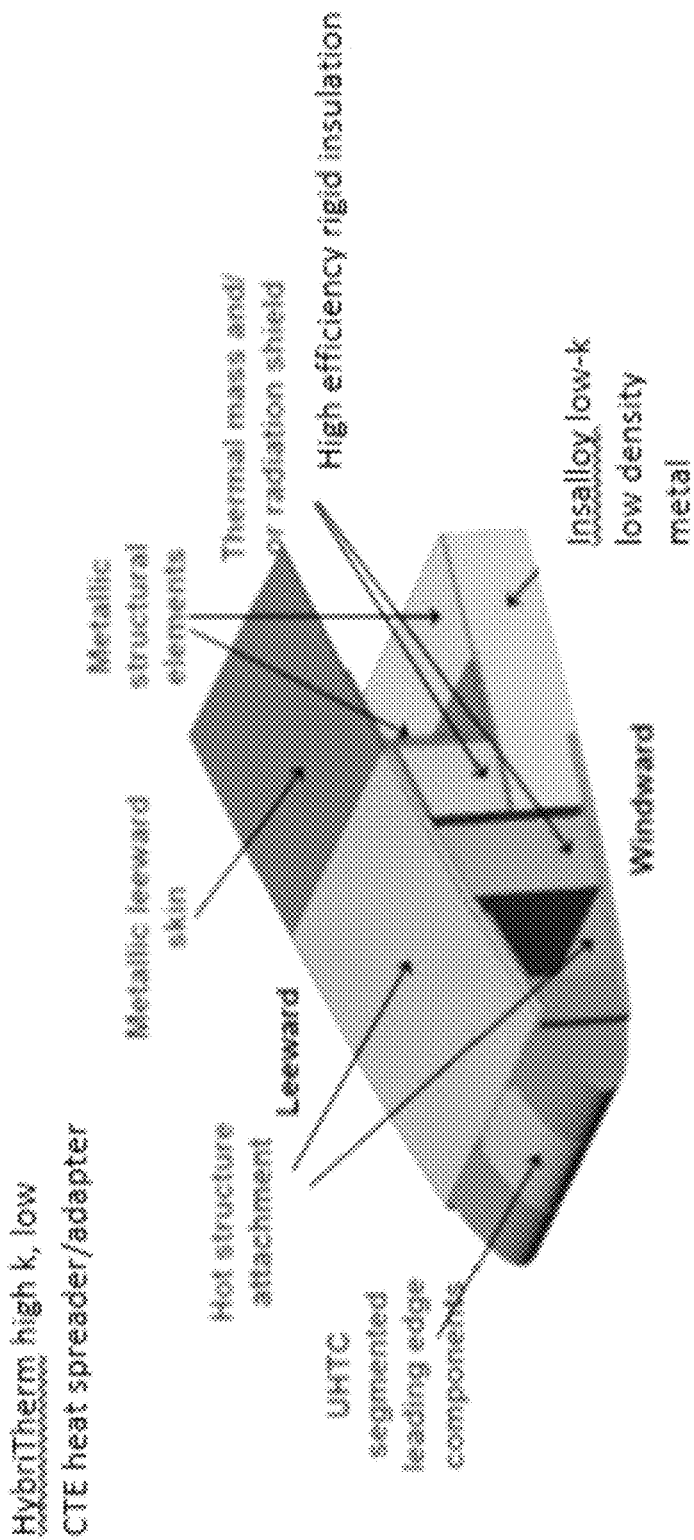
FIG. 2 illustrates a UHTC ceramic leading edge and syntactic metal aeroshell structure utilizing low cost, reliable (ductile) thermally-engineered metallic composites in accordance with the present disclosure.

A non-limiting segmented UHTC insert of FIG. 1 and integration scheme is illustrated in FIG. 2. FIG. 2 illustrates a UHTC ceramic leading edge and syntactic metal aeroshell structure utilizing low cost, reliable (ductile) thermally-engineered metallic composites.

Figure 3:
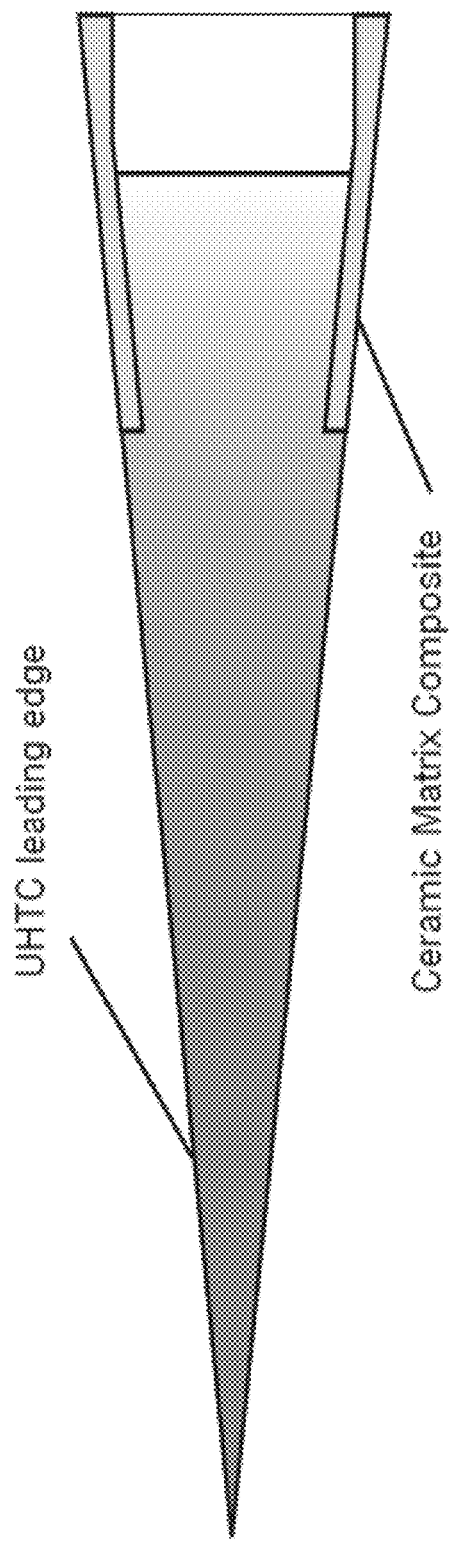
FIG. 3 illustrates a leading edge conceptual design for a heat spreader/adapter in accordance with the present disclosure.

A less complex assembly is illustrated in FIG. 3. FIG. 3 illustrates a leading edge conceptual design for a HybriTherm adapter (e.g., heat spreader/adapter). The shape and size of the overlap and the length of the heat spreader can be evaluated to select a design for fabrication and testing.

For a heat-impinged structure, the multifunctional high thermal conductivity structured multi-phase composite can be used as a cover over a thermally-insulating structure to spread thermal point loads while protecting an underlying structure. One such application is a jet blast deflector wherein an exhaust plume of up to 1500° C. or more impinges an area. When such a deflector is fabricated from steel, the jet blast deflector must be actively cooled. With a thermally-conductive structure faceplate that uses the multifunctional high thermal conductivity structured multi-phase composite of the present disclosure as a covering insulator, the heat can be moved away from the point of application by passive radiation or air-cooling, while preventing significant temperature rise in the deflector (and therefore buckling and warpage) of the underlying steel or other metal structure.

Another non-limiting application is to manage heat in engine structures. Adding high thermal conductivity fillers, such as BN or carbon, into aluminum or magnesium engine structures allows for increased heat transfer to either the air (air-cooled engines, such as motorcycles) or to oil or water fluids (conventional engines) so as to remove heat and allow thinner, lighter engines to be manufactured with improved fuel economy.

Production Of Structured Multi-Phase Composite

Figure 4:
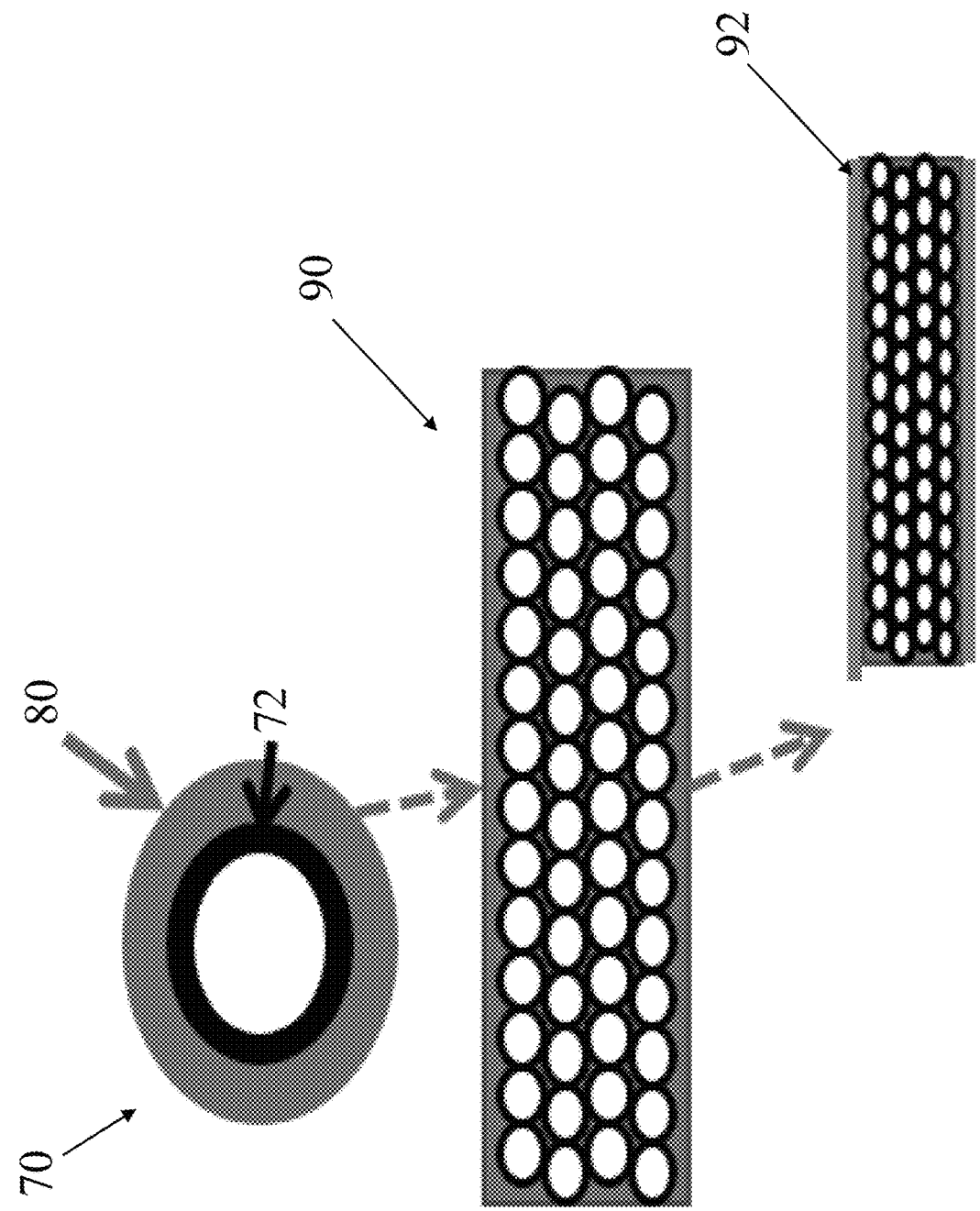
FIG. 4 illustrates a filler that includes a cavity which is filled with a phase change material such as salt mixture, alkali metal, metal alloy, and the outer surface of the filler is coated with a metal material.

The structure of the structured multi-phase composite is a syntactic composite in which the filler is roughly spherical (axisymmetrix, or equiaxed) and normally added to the metal during processing as microspheres or microcapsules. In general, the structured multi-phase composite can be fabricated by powder metallurgy techniques or via melt casting techniques. As illustrated in FIG. 4, a high thermal conductivity phase or filler 70 is provided that can optionally include a cavity 72 which can be optionally filled with a phase change material such as salt mixture, alkali metal, metal alloy, generally with a phase change temperature of 300-1350° C., and typically 650-1150° C. The outer surface of the high thermal conductivity phase or filler is coated with a metal material 80. The type of coating process used, the composition of the metal coating, and the thickness of the metal coating depends on the final application for the formed structured multi-phase composite. The coated high thermal conductivity phase or filler is then consolidated together to form the structured multi-phase composite 90.

An additional metal 92 can be added during the consolidation process.

Figure 5:
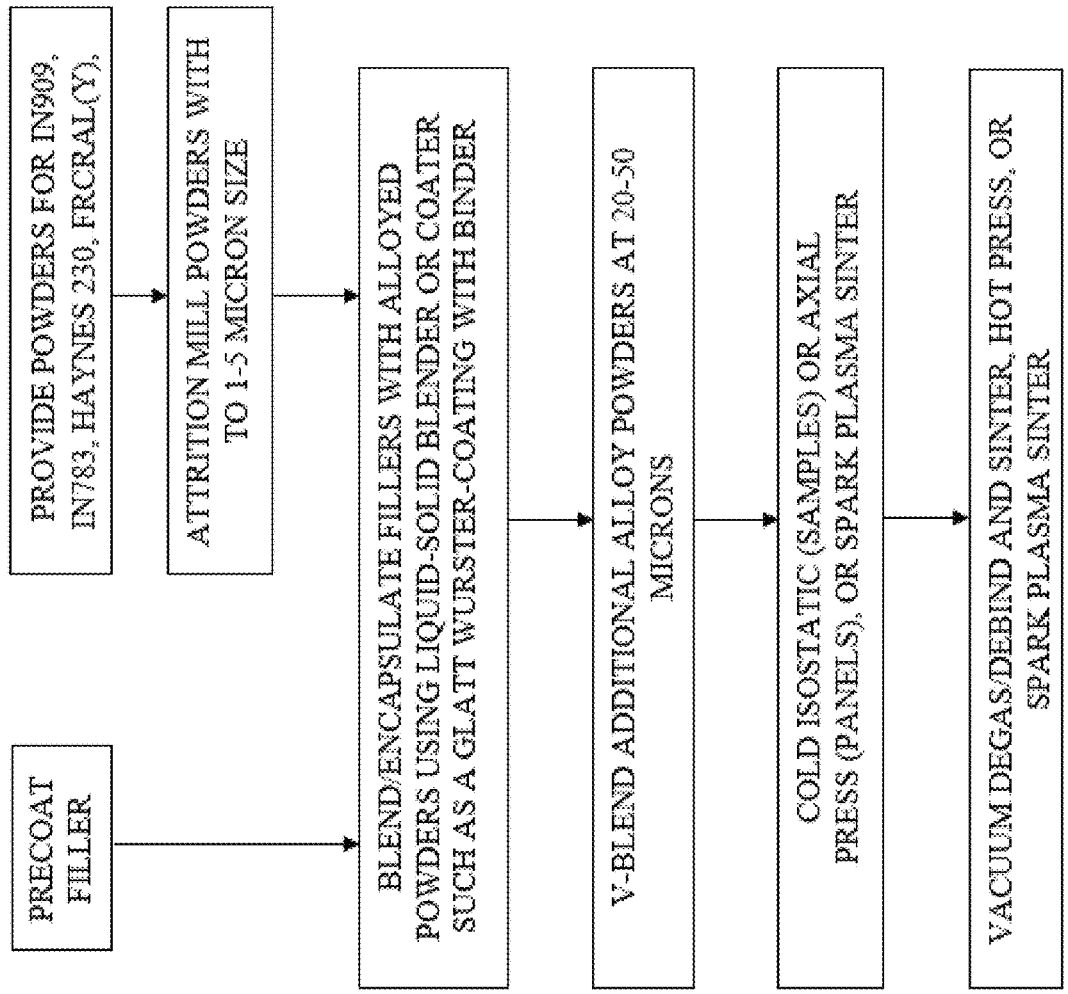
FIG. 5 illustrates a method for forming the engineered metallic composites in accordance with the present disclosure by a powder metallurgy manufacturing process.
Figure 6:
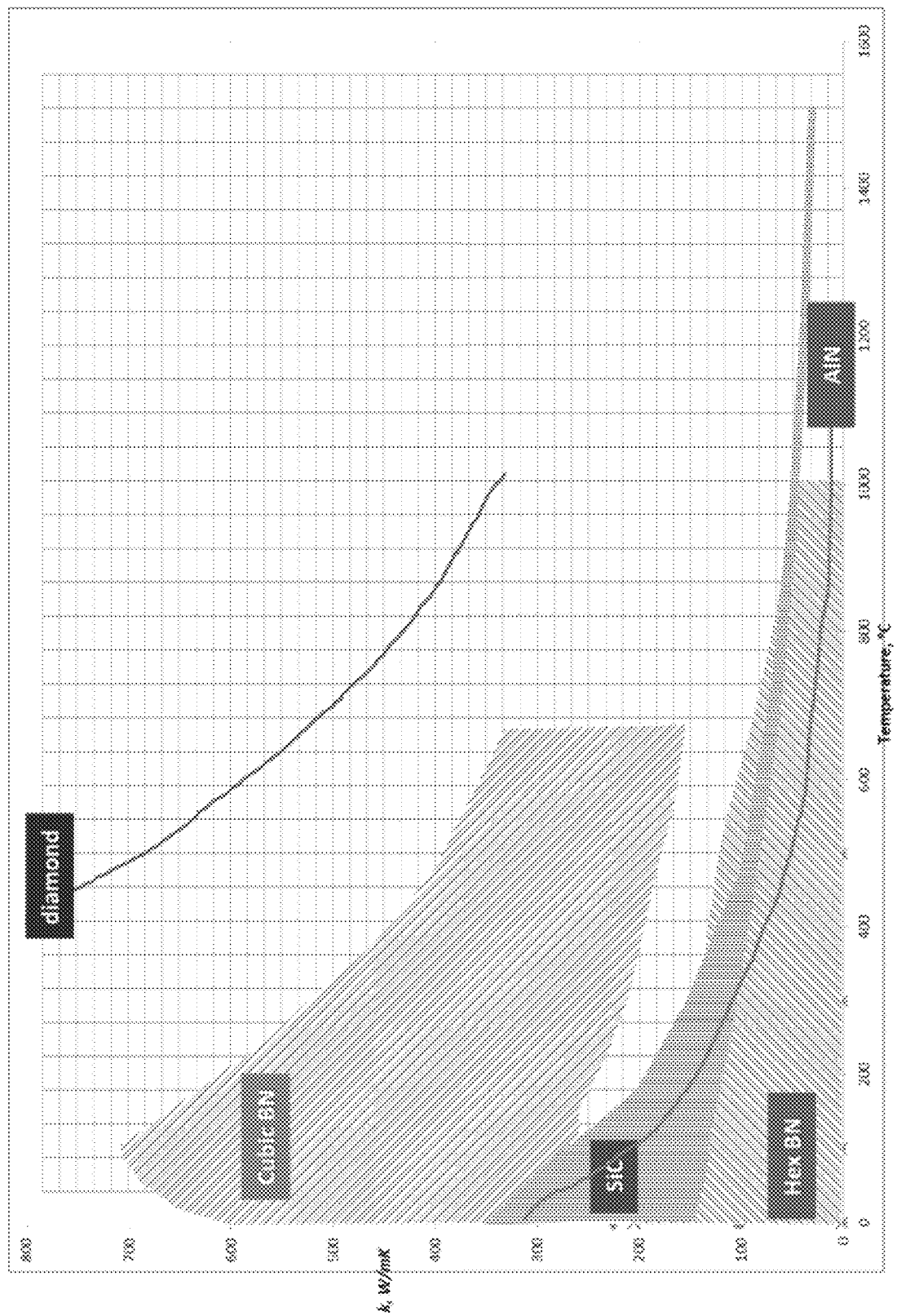
FIG. 6 illustrates a plot depicting the thermal conductivity of several of the highest thermally conductive materials. Above 800° C. the primary choices for high thermal conductive material are cubic boron nitride and diamond.
Figure 7:
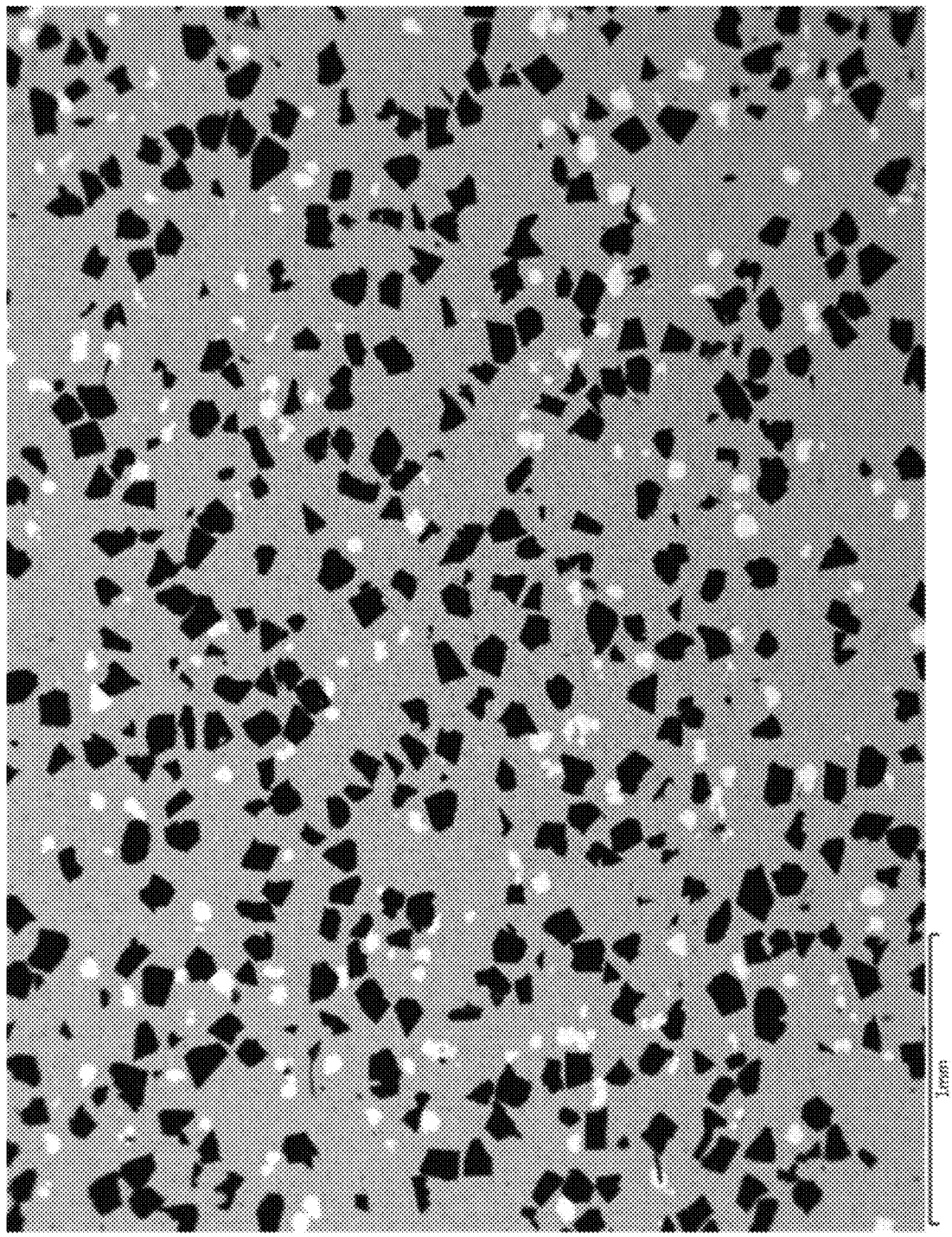
FIG. 7 illustrates a SEM micrograph of an engineered multi-phase composite comprising of a 35 vol. % high thermal conductive phase cubic boron nitride (black particles), and 10 vol. % tungsten additive for increased toughness and hardness (white particles) in a Nb752 alloy composite.
Figure 8:
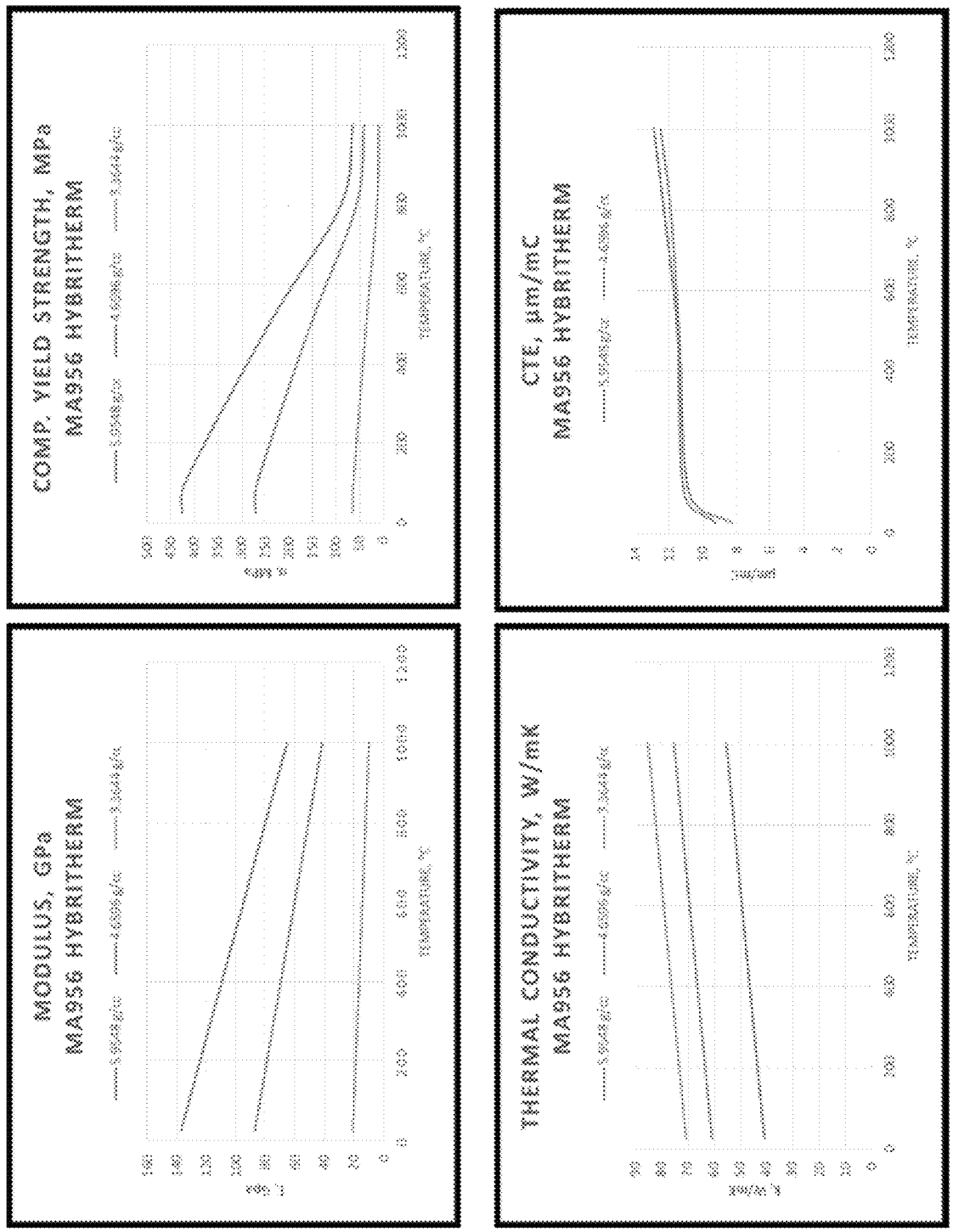
FIG. 8 illustrates thermal and mechanical property trends over temperature (based on theoretical and empirical trending) for several HybriTherm MA956 engineered multi-phase composites of varying density.
Figure 9:
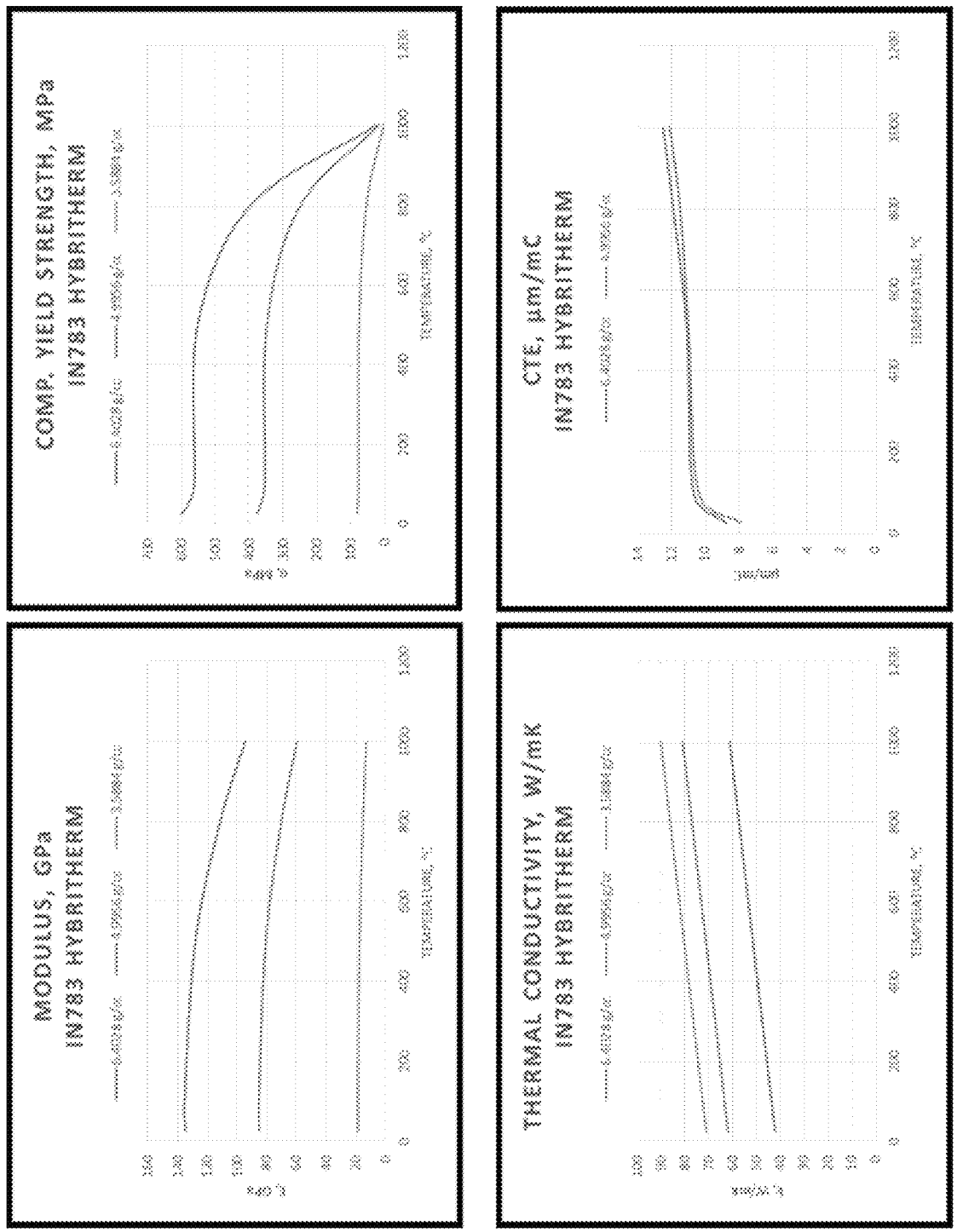
FIG. 9 illustrates thermal and mechanical property trends over temperature (based on theoretical and empirical trending) for several HybriTherm IN783 engineered multi-phase composites of varying density.
Figure 10:
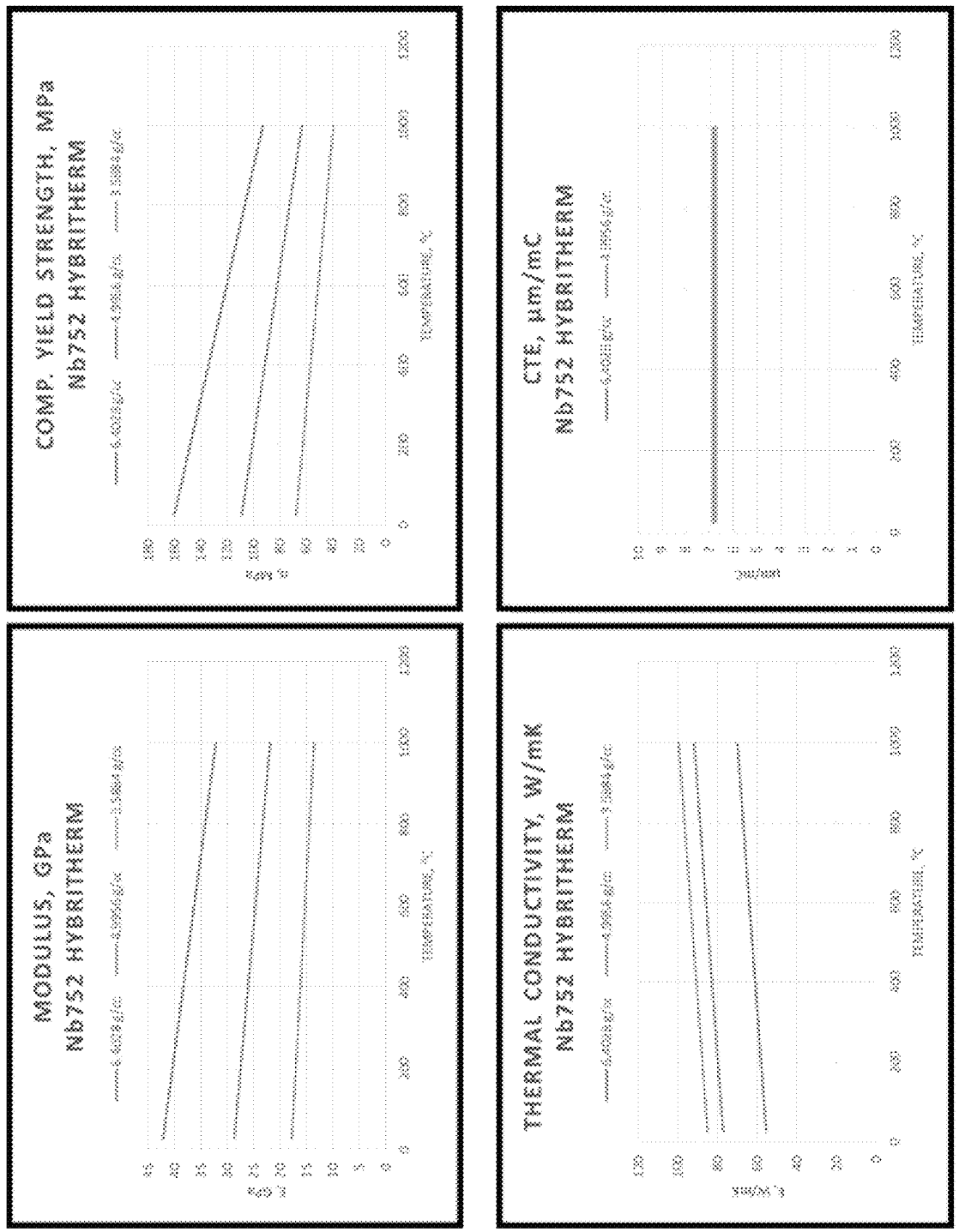
FIG. 10 illustrates thermal and mechanical property trends over temperature (based on theoretical and empirical trending) for several HybriTherm Nb752 engineered multi-phase composites of varying density.
Figure 11:
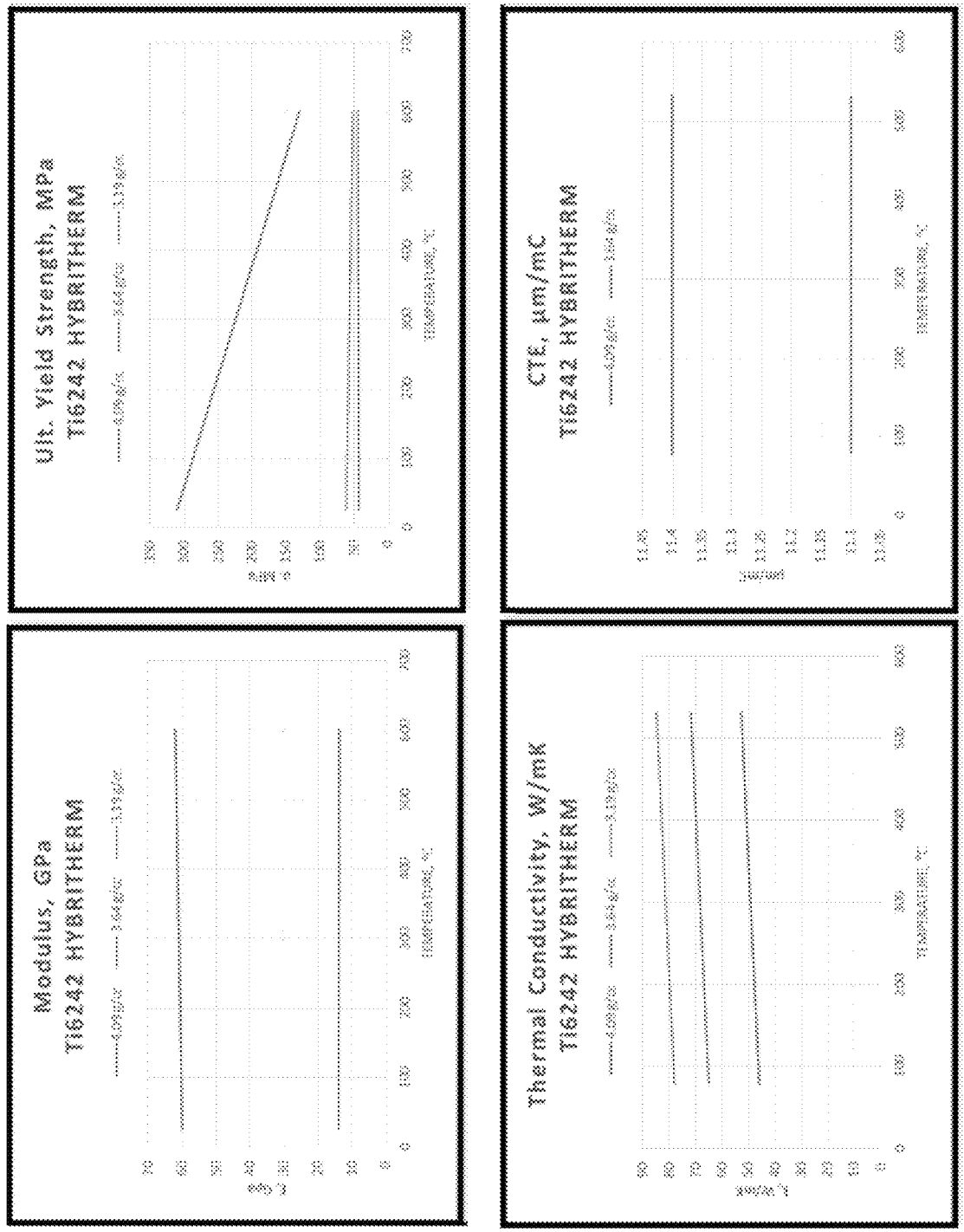
FIG. 11 illustrates thermal and mechanical property trends over temperature (based on theoretical and empirical trending) for several HybriTherm Ti6242 engineered multi-phase composites of varying density.

FIG. 5 illustrates a non-limiting powder metallurgy manufacturing sequence.

Due to the high density difference between the high thermal conductivity phase and the metal phase and the reactivity of materials at high temperatures, higher temperature materials (including titanium, niobium alloys (C103, CB752), molybdenum (TZM), tungsten, tantalum, nickel alloys, and superalloys such as IN909, IN718, MA956, IN625, FeCrAlY's, HAYNES 230, etc.) are normally fabricated using powder metallurgy techniques. Lower melting and lower density materials, such as magnesium and aluminum, can be manufactured using casting techniques such as thixomolding (semi-solid forming), squeeze casting, pressure or pressureless infiltration casting into a preform, or even stir casting. Powder metallurgy techniques include spark plasma sintering, other field-assisted sintering, pressureless sintering, hot pressing, hot isostaic pressing, injection molding, and other powder metallurgy techniques.

To reduce interface thermal resistance and enable wetting for melt infiltration, or to reduce contiguity by forming a transient liquid phase, a coating can be optionally applied to the high thermal conductivity phase prior to infiltration or coating. The coating can serve to enhance wetting (e.g., nickel, boron, copper, aluminum, and/or titanium), reduce contact resistance (e.g., tungsten and/or copper), control separation/volume fraction of the high thermal conductivity phase in a preform or during processing (any material, powders preferred), and prevent contiguity to increase toughness and strength (any method). Several techniques have been demonstrated, including adding a metal coating by such techniques as powder coating (wurster or other encapsulation technique), with or without presintering, CVD or other vapor solid coating, electroplating, molten salt plating, and other techniques. One non-limiting coating technique is powder encapsulation through a mixing process, such as wurster or other fluid bed coating, or ribbon or high shear blending of a ceramic or preceramic polymer balloon, metal powders, a clean burning (thermal removal) or easily removed binder such as PEG, wax, polysacharrides, other low ash content or easily vaporized binders, and a solvent.

In one non-limiting embodiment, heated high thermal conductivity phase particles are added to a bed of solid binder plus metal powder, which is adhered to the surface. Wax, PVB (polyvinyl butyral), and/or other low melting binders can be used in that process. A binder can be applied to the high thermal conductivity phase surface and heated to its melting point; the binder-coated high thermal conductivity phase can then be added to a bed of metal powder. In general, the metal powder size is less than $1/6^{th}$ of the high thermal conductivity phase size, typically less than $1/10^{th}$ of the high thermal conductivity phase size, and more typically less than $1/50^{th}$ of the high thermal conductivity phase size.

Using a powder or metal-coated ceramic high thermal conductivity phase, additional metal is normally added by blending. Normally, the mixing is used to fill between the ceramic balloons to maximum green packing density. Multiple size particles of high thermal conductivity phase can be used for similar purposes to fill interstices, generally with particle cuts $1/4^{th}$ -$1/6^{th}$ of the prior size cut.

For melt-infiltrated materials, a wetting coating can be used for infiltration techniques and for other casting (thixocasting). This wetting coating can be a ceramic such as TiN, copper, silicide, and/or tungsten, but is most commonly a eutectic-forming or active metal. The wetting coating can be added as a powder or coated onto the surface. The metals can include the matrix metal, zinc, nickel, copper, titanium, silicon, palladium, among others. Most often, active metals (e.g., titanium, silicon, zirconium, palladium, etc.) are used to enhance wetting.

To control mechanical properties of the structured multi-phase composite, particularly tensile and fracture toughness, it is desirable to ensure that the ceramic phases are not contiguous (not touching). A contiguity below 0.2, and generally below 0.1 or 0.05 is desired. The desired contiguity can be controlled by wetting, powder mixing, and/or by adding a powder coating to separate the high thermal conductivity phase during the infiltration processes. The desired contiguity can also be achieved or enhanced by post-fabrication deformation processing, such as by constrained rolling or forging.

In one non-limiting embodiment, the high thermal conductivity phase is coated with a metal or metal alloy powder and then melt infiltrated with the matrix material. The powder-coated fillers can be presintered or added to a container and constrained while infiltration takes place; however, this is not required.

For improved corrosion resistance (mainly oxidation) and to increase temperature limits, the structured multi-phase composite thermal structure can be coated. For hypersonic and other high temperature structures, a thermal barrier coating such as, but not limited to, mullite, BSA, other aluminosilicates, and/or zirconia (generally yttria-stabilized zirconia) can be applied. These are generally applied between 10-100 mils (0.01"-0.1") using plasma spray processes; however, other coating processes such as solution spray or slurry coating can also be used.

Oxidization coatings can be used and typically depend on the materials system. For titanium systems, MCrAlY or nickel-copper-chromium-aluminum alloy coatings applied by thermal spray, PVD, or slurry coating are very effective. For niobium alloys, silicide slurry coatings containing chrome and silicon, such as R512E from HiTempco™ are very effective. Titanium-chromium-silicon, and vanadium-chromium-silicon can be used, but molybdenum-, tungsten-, and iron-containing silicide systems can also be effective. For superalloy and nickel-based alloy systems, MCrAlY coatings and diffusion coatings, including those applied by pack aluminizing, can be used. For molten salt storage systems, multi-phase composites made from nickel-based alloys, such as HAYNES® 230® alloy (e.g., 55-60 wt. % nickel, 20-24 wt. % chromium, 12-16 wt. % tungsten, 0-4 wt. % molybdenum, <4 wt. % iron, <6 wt. % cobalt, 0-1 wt. % manganese, 0-1 wt. % silicon, 0-1 wt. % niobium, 0-1 wt. % aluminum, 0-0.5 wt. % titanium, <0.3 wt. % carbon) or Hastelloy-N (e.g., 68-73 wt. % nickel, 5-8 wt. % chromium, 14-18 wt. % molybdenum, <6 wt. % iron, 0-2 wt. % silicon, 0-1 wt. % manganese, 0-1 wt. % vanadium, <0.2 wt. % carbon, <0.5 wt. % cobalt, <0.5 wt. % copper, 0-1 wt. % tungsten, <0.6 wt. % aluminum, <0.6 wt. % titanium exhibit excellent resistance to molten salts. Additional aluminizing, or using a lower cost iron alloy with a graded, coated, or layered high nickel alloy surface can be used for operation above 650° C.

EXAMPLES

Example 1

A high speed vehicle airframe panel was designed using a ceramic leading edge insert and an insulating structure. A thermal transition piece is fabricated from a BN-filled FeCrAlY, in the structure illustrated in FIG. 1 or 2 or 3. The HybriTherm thermally-engineered attachment structure includes a MA956 alloy (37-57 wt. % iron, 16-23 wt. % chromium, 2-7 wt. % aluminum, 0-1 wt. % titanium, 0-1 wt. % copper, 0-1 wt. % manganese, 0-1 wt. % cobalt, 0-1 wt. % nickel, 0-1 wt. % $Y_2O_3$, <0.2 wt. % carbon) multi-phase composite that is fabricated by premixing 40 vol. % of 60 micron D50 spheroidized BN fillers (boron nitride), which possess a 80-92 wt. % increase (and all values and ranges therebetween) addition of nickel coating by a solution based adsorption method, with 15-35 vol. % (and all values and ranges therebetween) (e.g., 25 vol. %) of 1-10 micron powder (and all values and ranges therebetween) mixture of 70-80 wt. % iron (and all values and ranges therebetween) (e.g., 75.5 wt. % iron), 15-25 wt. % chromium (and all values and ranges therebetween) (e.g., 20 wt. % chromium), and 1-6 wt. % aluminum (and all values and ranges therebetween) (e.g., 4 wt. % aluminum), with less than 1 wt. % titanium and less than 1 wt. % yttrium using a spray-coating technique using 1-4% (and all values and ranges therebetween) (e.g., 2 %) of 2500-4000 MW (and all values and ranges therebetween) (e.g., 3000MW) PEG in acetone to adhere them to the microballoons and then subsequently blending in an additional 20-30 vol. % (and all values and ranges therebetween) (e.g., 25 vol. %) of 250-400 mesh (and all values and ranges therebetween) (e.g., 325 mesh) prealloyed MA956 (or roughly compositional equivalent gas-atomized alloy used in plasma spray) powder. The material is spark plasma sintered at 950-1200° C. (and all values and ranges therebetween) (e.g., 1000° C.) and 5-40 MPa (and all values and ranges therebetween) (e.g., 20 MPa) pressure in graphite dies. After spark plasma sintering for 20 minutes, the material was EDM machined into an attachment structure, which assembled with a UHTC lead edge insert. The material demonstrates a 350-450% increase (and all values and ranges therebetween) in thermal conductivity at 300° C. compared to its parent metal, MA956. Additional property modifications include a 30-45% reduction (and all values and ranges therebetween) in modulus and a 30-45% reduction (and all values and ranges therebetween) in density.

Example 2

A multi-phase composite panel was fabricated using powder metallurgy processing from Hastelloy-N (e.g., 68-73 wt. % nickel, 5-8 wt. % chromium, 14-18 wt. % molybdenum, <6 wt. % iron, 0-2 wt. % silicon, 0-1 wt. % manganese, 0-1 wt. % vanadium, <0.2 wt. % carbon, <0.5 wt. % cobalt, <0.5 wt. % copper, 0-1 wt. % tungsten, <0.6 wt. % aluminum, <0.6 wt. % titanium) and alloy powders using the sequence described in Example 1, but sintered at 950-1200° C. (and all values and ranges therebetween) (e.g., 1080° C.). The material was fabricated into thin sheets, which were alternately etched with complex channels. The solid panels and machined panels were stacked and spark plasma bonded into a solid core of a heat exchanger. The material demonstrates a 400-500% increase (and all values and ranges therebetween) in thermal conductivity compared to its parent metal, Hastelloy-N. Additional property modifications include a 65-90% reduction (and all values and ranges therebetween) reduction in modulus, a 5-15% reduction (and all values and ranges therebetween) in CTE, and a 30-45% reduction (and all values and ranges therebetween) reduction in density.

Example 3

A magnesium multi-phase composite electronic box was fabricated by melt infiltrating a calcium-modified AZ61 alloy containing calcium and cerium (85-92 wt. % magnesium, 5.80-7.2 wt. % aluminum, 0.4-1.5 wt. % zinc, up to 0.15 wt. % manganese, up to 0.1 wt. % silicon, up to 0.05 wt. % copper, up to 0.005 wt. % nickel, up to 0.005 wt. % iron, up to 2 wt. % calcium, up to 1 wt. % cerium, up to 1.5 wt. % graphene platelets) into a 35-50 vol. % (and all values and ranges therebetween) (e.g., 40 vol. %) spheroidized BN filler preform space using preallowed AZ61 (88-92 wt. % magnesium, 5.80-7.2 wt. % aluminum, 0.4-1.5 wt. % zinc, up to 0.15 wt. % manganese, up to 0.1 wt. % silicon, up to 0.05 wt. % copper, up to 0.005 wt. % nickel, up to 0.005 wt. % iron)+titanium powders applied (blended) to the fillers using squeeze casting. The 2" thick billets were extruded into a complex finned profile for use as heat sinks in electronic boxes.

Example 4

A molten salt interior insulator liner was designed and fabricated from a diamond-filled IN783 syntactic metal composite (e.g., 33-42 wt. % cobalt, 24-32 wt. % nickel, 22-30 wt. % iron, 2-5 wt. % chromium, 2-5 wt. % niobium, 4-7 wt. % aluminum, 0-1 wt. % manganese, 0-1 wt. % silicon, 0-1 wt. % copper, 0-0.8 wt. % titanium, 0-0.2 wt. % boron, <0.1 wt. % copper) with added negative thermal expanding filler. The HybriTherm thermally-engineered liner comprising of IN783 alloy multi-phase composite that is fabricated by v-blend premixing 20-40 vol. % (and all values and ranges therebetween) (e.g., 30 vol. %) of 70-150 micron (and all values and ranges therebetween) (e.g., 100 micron) D50 irregular shaped diamond grit coated with 10-30 wt. % (and all values and ranges therebetween) (e.g., 20 wt. %) diamond, TiN by a fluid bed-CVD method, with 50-70 vol. % (and all values and ranges therebetween) (e.g., 60 vol. %) of 1-10 (and all values and ranges therebetween) micron elemental powder mixture of 22-28 wt. % iron (and all values and ranges therebetween) (e.g., 26 wt. % iron), 1-5 wt. % chromium (and all values and ranges therebetween) (e.g., 3 wt. % chromium), 4-7 wt. % aluminum (and all values and ranges therebetween) (e.g., 5.5 wt. % aluminum), 24-30 wt. % nickel (and all values and ranges therebetween) (e.g., 28 wt. % nickel), 1-4 wt. % niobium (and all values and ranges therebetween) (e.g., 3 wt. % niobium), 32-36 wt. % cobalt (and all values and ranges therebetween) (e.g., 34.25 wt. % cobalt), and 0-1 wt. % titanium powders (and all values and ranges therebetween) (e.g., 0.25 wt. % titanium powders). A secondary additive filler was added of negative CTE $HfV_2O_7$ in the amount of 4-15 vol. % (and all values and ranges therebetween) (e.g., 10 vol. %). The material mixture was fabricated into an insert liner by hot isostatic pressing sintered at 900-1200° C. (and all values and ranges therebetween) (e.g., 1050° C.) and 20-60 MPa pressure (and all values and ranges therebetween) (e.g., 40 MPa pressure) in a boron nitride coated stainless steel die. The material demonstrated a 400-700% increase (and all values and ranges therebetween) (e.g., 600% increase) in thermal conductivity at 750° C. compared to its parent metal, IN783. Additional property modifications include a 20-40% reduction (and all values and ranges therebetween) (e.g., 31% reduction) in modulus, a 18-32% increase (and all values and ranges therebetween) (e.g., 24% decrease) in CTE, and a 20-44% reduction (and all values and ranges therebetween) (e.g., 34% reduction) in density.

It will thus be seen that the objects set forth above, among those made apparent from the preceding description, are efficiently attained, and since certain changes may be made in the constructions set forth without departing from the spirit and scope of the present disclosure, it is intended that all matter contained in the above description and shown in the accompanying drawings shall be interpreted as illustrative and not in a limiting sense. The present disclosure has been described with reference to preferred and alternate embodiments. Modifications and alterations will become apparent to those skilled in the art upon reading and understanding the detailed discussion of the present disclosure provided herein. This disclosure is intended to include all such modifications and alterations insofar as they come within the scope of the present disclosure. It is also to be understood that the following claims are intended to cover all of the generic and specific features of the present disclosure herein described and all statements of the scope of the present disclosure, which, as a matter of language, might be said to fall there between. The present disclosure has been described with reference to the preferred embodiments. These and other modifications of the preferred embodiments as well as other embodiments of the present disclosure will be obvious from the present disclosure herein, whereby the foregoing descriptive matter is to be interpreted merely as illustrative of the present disclosure and not as a limitation. It is intended to include all such modifications and alterations insofar as they come within the scope of the appended claims.

What is claimed:

1. An engineered multi-phase composite which includes a high thermal conductivity phase comprising boron nitride and an iron-based metal phase, and wherein said high conductivity phase is segregated into isolated pockets forming a discontinuous phase having equivalent spherical dimensions from 10-400 microns in size and from 20-60 vol. % in said engineered multi-phase composite, said metal phase is a continuous phase in said engineered multi-phase composite, said engineered multi-phase composite has a thermal conductivity that is at least 40% greater than the thermal conductivity of said metal that forms said metal phase; said high thermal conductivity phase includes a phase change material, said phase change material undergoes a heat-absorbing phase change by melting or vaporization at a temperature of 250-1500° C.

2. The engineered multi-phase composite as defined in claim 1, wherein said high thermal conductivity phase constitutes 20-50 vol. % of said engineered multi-phase composite, said high thermal conductivity phase includes ceramic particles that have a lower modulus than said metal forming said metal phase, said high thermal conductivity phase is equiaxed or elliptical, said high thermal conductivity phase has a thermal conductivity at least two times said metal forming said metal phase, said high thermal conductivity phase has a coefficient of thermal expansion (CTE) at least 10% less than the CTE of the metal forming said metal phase.

3. The engineered multi-phase composite as defined in claim 1, wherein said high thermal conductivity phase includes ceramic particles and/or agglomerate particles of 15-400 micron in size, said ceramic particles include one or more materials selected from the group consisting of carbon, hexagonal boron nitride, graphene, carbon nanotubes, diamond, cubic boron nitride, boron nitride nanosheets, silicon carbide, aluminum nitride, graphite, titanium nitride, $V_2AlC$, $Ti_2AlC$, $Ti_3SiC_2$, and $Ti_3(Si_{0.5}Ge_{0.5})C_2$.

4. The engineered composite as defined in claim 3, wherein said high thermal conductivity phase includes agglomerate particles, the agglomerate particles contain a high thermal conductivity phase and additionally a phase that includes one or more of $ZrW_2O_8$, $ScF_3$, and $LiAlSiO_4$.

5. The engineered composite as defined in claim 3, which also contains a binder phase, said binder phase includes one or more of carbon, polymer derived carbon, $Bi_2O_3$, $SiO_2$, $LiAlSiO_4$, and $TiO_2$.

6. The engineered multi-phase composite as in claim 1, wherein said phase change material is selected from a) a salt or salt mixture, b) an alkali metal a meltable metal or alloy, and/or d) an eutectic metal alloy.

7. The engineered multi-phase composite as defined in claim 1, wherein said metal phase includes one or more metals selected from the group consisting of titanium, niobium, nickel, iron, molybdenum, aluminum, magnesium, copper, cobalt, or vanadium.

8. The engineered multi-phase composite as defined in claim 1, wherein said high thermal conductivity phase forms 15-50 vol. % of said engineered multi-phase composite.

9. The engineered multi-phase composite as defined in claim 1, wherein said metallic phase also incorporates 1-20 vol. % of additional phases that includes ceramic and/or intermetallic phases that modifies at least one thermal and mechanical properties of said multi-phase composite selected from the group consisting of elasticity, modulus, strength, density, hardness, corrosion resistance, thermal expansion (CTE), heat capacity, magnetic properties, and electrical properties.

10. The engineered multi-phase composite as defined in claim 1, wherein at least a portion of a high thermal conductivity phase is coated with one or more of a metal or ceramic material prior to formation of said engineered multi-phase composite, intended to engineer matrix interface compatibility.

11. The engineered multi-phase composite as defined in claim 10, wherein said high thermal conductivity phase coating or encapsulation is applied by milling, ALD, CVD, spray drying, fluid-bed spray coating, and/or solution-based chemical modification or adsorption.

12. The engineered multi-phase composite as defined in claim 1, wherein said engineered multi-phase composite further includes a coating or surface modification on an outer surface of said engineered multi-phase composite to improve corrosion/oxidation protection of said engineered multi-phase composite, said coating includes one or more materials selected from the group of iridium, platinum, rhenium, rhodium, silicides, MCrAl, MCrAlY, aluminum, aluminum alloy, and chrome-containing materials.

13. The engineered multi-phase composite as defined in claim 12, wherein said coating or surface modification is applied by pack cementation, slurry fusion, VD, CVD, plasma spray, thermal spray, cold spray, friction cladding, roll-bonding, roll-cladding, brazing, and/or electroplating.

14. The engineered multi-phase composite as defined in claim 12, wherein said coating is applied by a process that creates a bond between said coating and said outer surface of said composite that is at least 5000 psig strength, and by a coating process that forms a metallurgical bond between said coating and said composite.

15. The engineered multi-phase composite as defined in claim 1, wherein said engineered multi-phase composite further includes a coating or surface modification on an outer surface of said engineered multi-phase composite to increase surface temperature limits of said engineered multi-phase composite by about 50-250° C.

16. The engineered multi-phase composite as defined in claim 1, wherein said engineered multi-phase composite includes a ceramic leading edge.

17. The engineered multi-phase composite as defined in claim 1, wherein said engineered multi-phase composite forms a heat exchanger structure.

18. The engineered multi-phase composite as defined in claim 1, wherein said engineered multi-phase composite spreads and/or dissipates heat to reduce peak temperatures.

19. The engineered multi-phase composite as defined in claim 1, wherein said engineered multi-phase composite is used between a heat source and an insulating support or backing structure.

20. The engineered multi-phase composite as defined in claim 1, wherein said engineered multi-phase composite reduces stresses and temperatures in an engine environment, that includes piston or piston liner, engine duct, combustor, or exhaust.

21. The engineered multi-phase composite as defined in claim 1, wherein said engineered multi-phase composite resists atmospheric heating in a component that includes a hypersonic launch or reentry vehicle airframe, leading edge, acreage TPS, duct, flap, or seal.

22. The engineered multi-phase composite as defined in claim 1, wherein said engineered multi-phase composite resists engine and exhaust loads in a component that includes exhaust-impinged structures, nozzles or nozzle components, flaps, rings, channels, panels, or cowls.

23. The engineered multi-phase composite as defined in claim 1, wherein said engineered multi-phase composite is for use in a molten salt storage or transfer application selected from the group consisting of a heat exchanger, a molten salt system or molten salt tank lining.

24. The engineered multi-phase composite as defined in claim 23, wherein said engineered multi-phase composite is used in said molten salt system, said molten salt system includes one or more of chlorides, carbonates, nitrates, bromides, sulfides, and their mixtures.

25. The engineered multi-phase composite as defined in claim 1, wherein said engineered multi-phase composite is supported by and attached to a steel, superalloy, nickel-based alloy, titanium, or aluminum component to transfer loads to the ground, to a vehicle, to an airframe, or between components or panels.

26. The engineered multi-phase composite as defined in claim 1, wherein said engineered multi-phase composite is used to form panel or component intersections that are impermeable.

27. The engineered multi-phase composite as defined in claim 26, wherein said panel or component intersections are formed by panels or components that have been joined using at least one liquid or solid state welding processes, selected from the group consisting of arc welding, TEG welding, MIG welding, spray welding, friction stir welding, spark plasma sinter-welding, diffusion bonding, liquid enhanced diffusion bonding, and/or brazing.

28. The engineered multi-phase composite as defined in claim 1, wherein said engineered multi-phase composite is mechanically attached to other structures by at least one component selected from the group consisting of rivets, bolts, retainers, inserts, brazed insert, metallic washer seals, metal compression seals, and/or clips.

29. The engineered multi-phase composite as defined in claim 1, further comprising a standoff that has been placed between a higher temperature component and a load-bearing structural system, to remove, spread, and/or dissipate thermal energy to reduce overall system temperatures and/or control thermal stresses.

30. The engineered multi-phase composite as defined in claim 1, wherein said engineered multi-phase composite has a ductility at room temperature (25° C.) that is greater than about 2% strain to failure.

31. The engineered multi-phase composite as defined in claim 1, wherein said engineered multi-phase composite is fabricated using powder metallurgy or casting processes.

32. The engineered multi-phase composite as defined in claim 1, wherein said engineered multi-phase composite is manufactured by a process to form a near net shape.

33. The engineered multi-phase composite as defined in claim 1, wherein said engineered multi-phase composite is laminated or graded to control thermal stresses by varying CTE, modulus, or thermal conductivity across the width of a panel or component.

34. An engineered multi-phase composite which includes a high thermal conductivity phase comprising boron nitride and an iron-based metal phase, and wherein said high conductivity phase is segregated into isolated pockets forming a discontinuous phase having equivalent spherical dimensions from 10-400 microns in size and from 20-60 vol. % in said engineered multi-phase composite, said metal phase is a continuous phase in said engineered multi-phase composite, said engineered multi-phase composite has a thermal conductivity that is at least 40% greater than the thermal conductivity of said metal that forms said metal phase; said high thermal conductivity phase is encapsulated with a single or multilayer shell.

35. The engineered multi-phase composite as defined in claim 34, wherein said shell contains a strain absorbing material that includes carbon or layered, hexagonal carbides and nitrides (MAX phase), and a hermetic outer shell that includes a metal or ceramic or combination thereof, and wherein said metal includes one or more of nickel, cobalt, iron, titanium, aluminum, and chromium, and wherein said ceramic includes one or more of SiC, $Si_3N_4$, alumina, nitrides, and carbides.

36. An engineered multi-phase composite which includes a high thermal conductivity phase comprising boron nitride and an iron-based metal phase, and wherein said high conductivity phase is segregated into isolated pockets forming a discontinuous phase having equivalent spherical dimensions from 10-400 microns in size and from 20-60 vol. % in said engineered multi-phase composite, said metal phase is a continuous phase in said engineered multi-phase composite, said engineered multi-phase composite has a thermal conductivity that is at least 40% greater than the thermal conductivity of said metal that forms said metal phase; said metallic phase also incorporates 1-20 vol. % of additional phases that includes ceramic and/or intermetallic phases that modify at least one thermal and mechanical property of said multi-phase composite selected from the group consisting of elasticity, modulus, strength, density, hardness, corrosion resistance, thermal expansion (CTE), heat capacity, magnetic properties, and electrical properties; said additional phases include one or more filler additive particles, said additive particles include metals or ceramics or combinations thereof, wherein said metal includes one or more of nickel, aluminum, iron, chromium, molybdenum, niobium, tungsten, titanium, zirconium copper, hafnium, and alloys thereof, wherein said ceramic includes one or more of graphite, carbides, nitrides, shape memory particles, $Cu_2O$, $ZrWO_3$, beta-eucryptite, $LiAlSiO_4$, $ZrO_2$-$ZrWO_3$, CNT, CNF, $Hf(WO_4)_3$, $Mg(WO_4)_3$, $ZrW_2O_8$, $ZrMo_2O_8$, $HfW_2O_8$, $HfMo_2O_8$, Zeolites, $AlPO_4$, $ScF_3$, $HfV_2O_7$, $ZrV_2O_7$, $Zr_2(MoO_4)_3$, $CeP_2O_7$, $AuP_2O_7$, $ScF_3$, carbon nanotubes, graphene, boron nitride nanosheets, boron nitride nanotubes, cordierite, SiC, Allvar, wherein said metal or ceramic particles includes one or more of hollow spheres, rods, spherical, and/or oblong particles, said metal or ceramic particles having sizes ranging from 1/10th to 2 times the size of said high thermal conductivity phase.

37. An engineered multi-phase composite which includes a high thermal conductivity phase comprising boron nitride and an iron-based metal phase, and wherein said high conductivity phase is segregated into isolated pockets forming a discontinuous phase having equivalent spherical dimensions from 10-400 microns in size and from 20-60 vol. % in said engineered multi-phase composite, said metal phase is a continuous phase in said engineered multi-phase composite, said engineered multi-phase composite has a thermal conductivity that is at least 40% greater than the thermal conductivity of said metal that forms said metal phase; an outer surface of said engineered multi-phase composite includes insulation, and wherein such insulation is rigid or flexible.

38. The engineered multi-phase composite as defined in claim 37, wherein said insulation includes one or more materials selected from the group consisting of zirconia, stabilized zirconia, mullite, aluminosilicate, BAS, or EBC (environmental barrier coating).

39. A method for forming an engineered multi-phase composite comprising:
   a. providing an iron-based metal material to form a metal phase;
   b. providing a high thermal conductivity material comprising boron nitride wherein
      i. said high thermal conductivity material has at least 40% higher thermal conductivity than said metal phase; and,
      ii. said high thermal conductivity material further contains a material having a lower coefficient of thermal expansion (CTE) than that of the metal phase; and,
   c. consolidating said high thermal conductivity material with said metal material to form said engineered multi-phase composite,
      wherein the high conductivity material and material having a lower CTE are combined into a composite particle,
      wherein a phase formed by said high thermal conductivity material is discontinuous in said engineered multi-phase composite, said metal phase is a continuous phase in said engineered multi-phase composite, said engineered multi-phase composite has a CTE that is at least 10% less than the CTE of said metal forming said metal phase, said engineered multi-phase composite has a thermal conductivity that is at least 40% greater than a thermal conductivity of said metal that forms said metal phase, and
   forming said engineered multi-phase composite is formed into a thermal managing part, and attaching said thermal managing part to an insulating structure or layer.

40. The method as defined in claim 39, wherein at least a portion of said high thermal conductivity material is coated with a metal-coating material prior to said step of consolidating.

41. The method as defined in claim 40, wherein said metal-coating material has a different composition from said metal material that forms said metal phase.

42. The method as defined in claim 39, wherein said engineered multi-phase composite is coated with an outer coating material.

43. The method as defined in claim 39, wherein said thermal managing part is machined, etched, or otherwise formed into a channel structure and assembled into a final assembly with multiple channels that accommodates flow.

44. The method as defined in claim 39, further comprising joining said thermal managing parts using spark plasma sintering, brazing, diffusion bonding, liquid enhanced diffusion bonding, isostatic pressing, or hot pressing.

45. The method as defined in claim 39, wherein said engineered multi-phase composite is included in one or more structures selected from the group consisting of a load-bearing airframe structure, a hypersonic launch or reentry vehicle airframe, thermal transition piece, leading edge, acreage TPS, duct, flap, or seal to resist aerodynamic heating, exhaust-impinged structures, nozzles or nozzle components, flaps, rings, channels, panels, or cowls, an exhaust or engine flowpath, a heat exchanger, a molten salt contacted component or structure, a valve structure, a pump component, or jet blast deflector panel.

* * * * *